United States Patent [19]
Venkata et al.

[11] Patent Number: 5,751,138
[45] Date of Patent: May 12, 1998

[54] ACTIVE POWER CONDITIONER FOR REACTIVE AND HARMONIC COMPENSATION HAVING PWM AND STEPPED-WAVE INVERTERS

[75] Inventors: Subrahmanyam S. Venkata, Ames, Iowa; N. Ravisekhar Raju; Raxit A. Kagalwala, both of Seattle, Wash.; Vedula V. Sastry, Madras, India

[73] Assignee: University of Washington, Seattle, Wash.

[21] Appl. No.: 667,924

[22] Filed: Jun. 20, 1996

Related U.S. Application Data

[60] Continuation-in-part of provisional application No. 60/000,443, Jun. 22, 1995.

[51] Int. Cl.[6] .................... G05F 1/70; H02M 1/12
[52] U.S. Cl. ..................... 323/207; 363/41; 363/43
[58] Field of Search ....................... 323/207, 208, 323/209, 210, 211; 363/41, 43

[56] References Cited

U.S. PATENT DOCUMENTS

| | | | |
|---|---|---|---|
| 3,825,814 | 7/1974 | Pelly | 321/9 A |
| 4,903,184 | 2/1990 | Hirose | 363/37 |
| 5,138,247 | 8/1992 | Tanoue et al. | 323/207 |
| 5,321,598 | 6/1994 | Moran | 363/41 |
| 5,384,696 | 1/1995 | Moran et al. | 323/207 |
| 5,438,253 | 8/1995 | Aritsuka et al. | 323/207 |
| 5,495,403 | 2/1996 | Dhyanchand et al. | 363/43 |
| 5,586,018 | 12/1996 | Aoyama et al. | 363/41 |
| 5,642,007 | 6/1997 | Gyugyi et al. | 323/207 |
| 5,642,273 | 6/1997 | Lai et al. | 363/56 |

OTHER PUBLICATIONS

Flairty, C.W., "A 50-KVA Adjustable-Frequency 24-Phase Controlled Rectifier Inverter," (pp. 332-336), Reprinted from IRE Transactions on Industrial Electronics, pp. 56-60, May 1962.

Primary Examiner—Peter S. Wong
Assistant Examiner—Derek J. Jardieu
Attorney, Agent, or Firm—Ronald M. Anderson

[57] ABSTRACT

An active power quality conditioner for compensating reactive power and harmonic distortion in power systems. A pulse width modulated (PWM) inverter (70) for each phase is controlled to produce a harmonic distortion compensation signal that is coupled to an inductor. The inductor is connected in series between a stepped-wave inverter (84) and one phase of the power line. A current produced by the stepped-wave inverter compensates for the reactance of a load coupled to the power line. The PWM inverter operates at a frequency that is substantially greater than the fundamental frequency of the power line and is not exposed to the full power line voltage; it can be constructed using components of relatively low power and voltage rating. In contrast, the stepped-wave inverter, which is decoupled from the PWM inverter, operates at the fundamental frequency and is subjected to most of the stress. Both shunt coupled and series coupled compensators are described. Compensation for an unbalanced load is provided using a compensator (364) that includes a 24-pulse stepped-wave inverter (366).

29 Claims, 11 Drawing Sheets

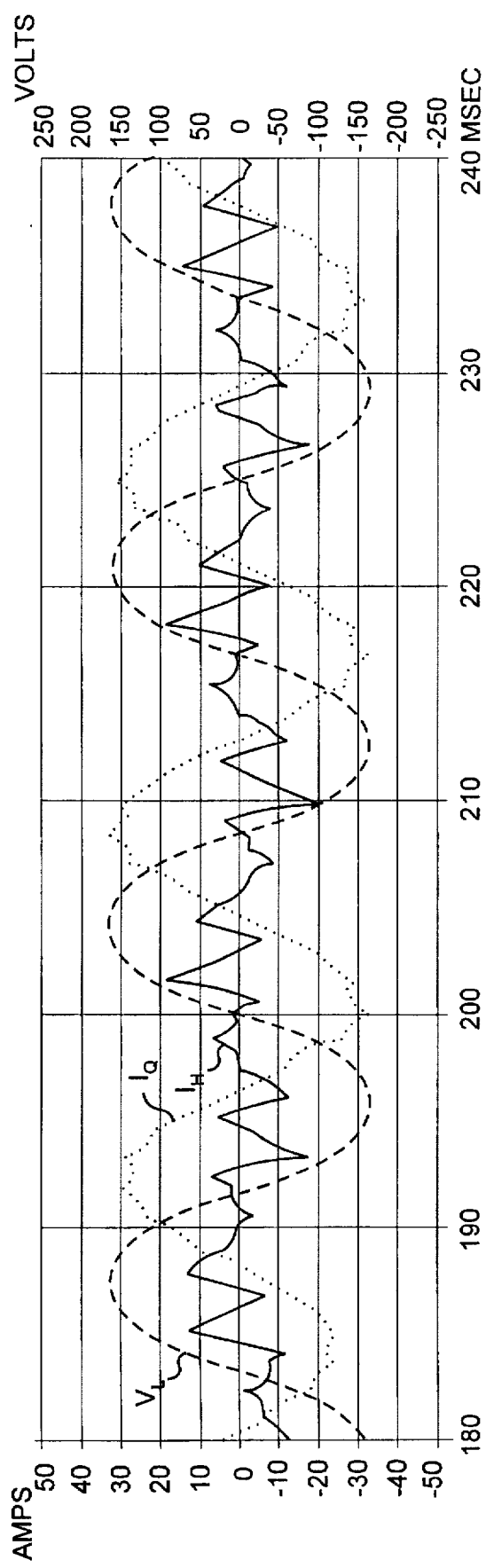
FIG. 13
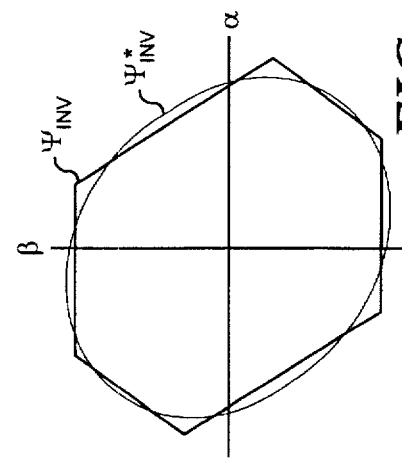
FIG. 16
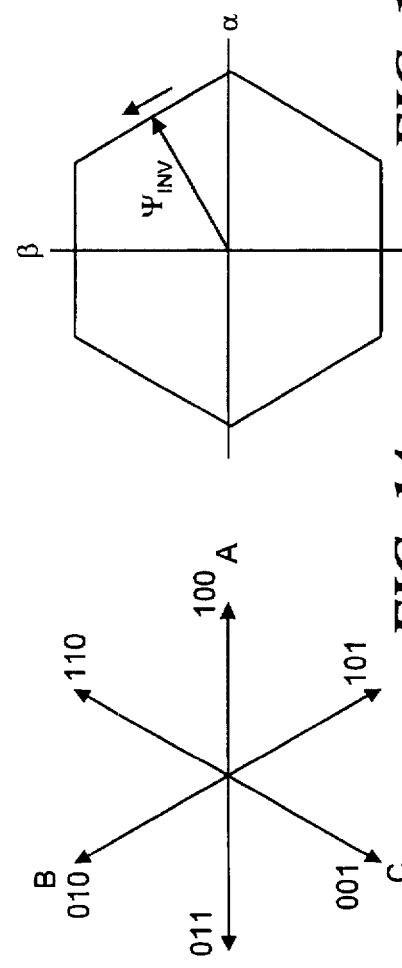
FIG. 15
FIG. 14

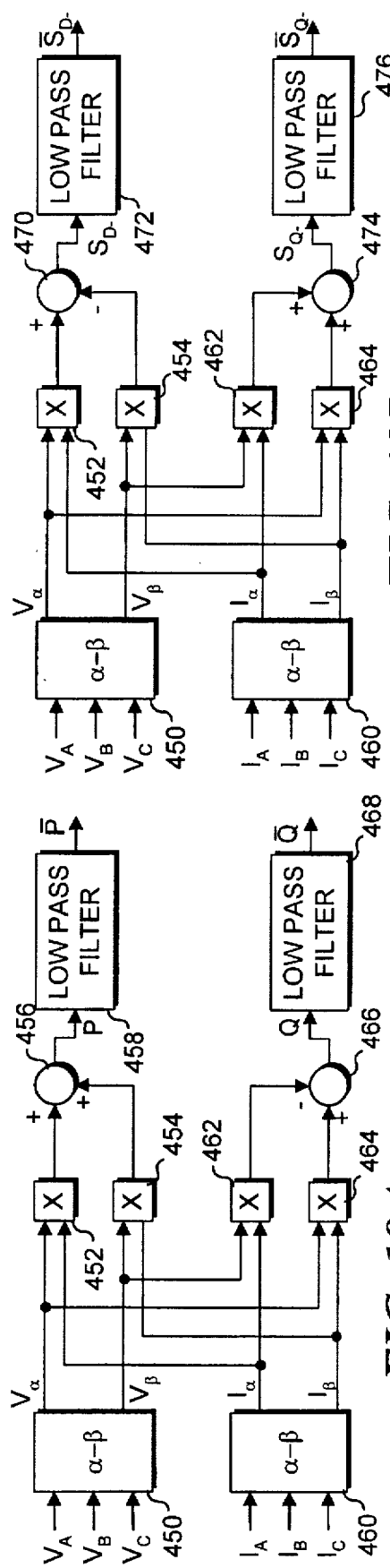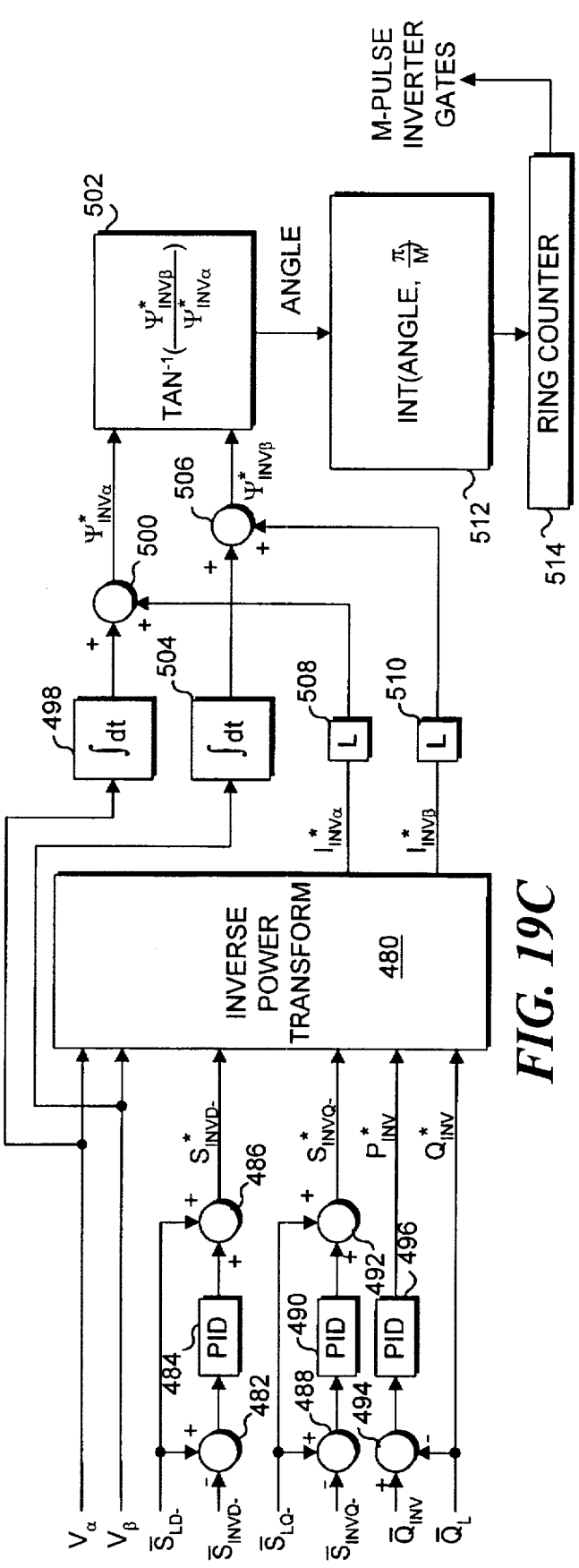
FIG. 19A
FIG. 19B
FIG. 19C

ACTIVE POWER CONDITIONER FOR REACTIVE AND HARMONIC COMPENSATION HAVING PWM AND STEPPED-WAVE INVERTERS

RELATED APPLICATION

This application is a continuation-in-part application, based on prior copending provisional application Serial No. 60/000,443, filed on Jun. 22, 1995, the benefit of the filing date of which is hereby claimed under 35 U.S.C. § 120.

FIELD OF THE INVENTION

The present invention generally relates to power line conditioners of the active type, and more specifically, to active, reactive power and harmonic distortion conditioners that respectively compensate for reactive loads and for the harmonic distortion on a power line.

BACKGROUND OF THE INVENTION

In recent years, the requirements for the quality of power supplied by electric utility companies have become more stringent due to the widespread use of sensitive electronic loads, ranging from home VCRs, computers, and digital clocks to automated industrial process controls. Electrical disturbances on a power line that would have had little effect on equipment connected to the power grid a few years ago can now bring an entire assembly line to a standstill and even cause damage to equipment—both commercial and residential. Power quality-related problems have been estimated by some experts to cost U.S. companies about $26 billion a year in down-time and lost revenue.

Traditionally, electric power utilities have used mechanical and passive equipment such as phase shifting or tap-changing transformers, series capacitors, and shunt capacitors and reactors to provide reactive and harmonic distortion compensation at the transmission level. At the distribution level, power-factor correction has conventionally been accomplished with mechanically switched or thyristor-controlled capacitor banks, and harmonics are usually suppressed using a set of capacitor-inductor filters connected in parallel, each tuned to "trap" a different undesired frequency. However, these conventional passive measures have several disadvantages. Specifically, the mechanical and passive measures used for transmission lines typically require bulky equipment and are not sufficiently fast in responding to changes in the system. If control changes are made frequently, the compensation equipment will quickly wear. Passive devices such as series capacitors can introduce problems with sub-synchronous oscillations. The conventional passive filters used on distribution lines can produce unexpected resonance conditions when the filter impedance and the system impedance act as a resonant circuit. Passive filters are also incapable of quickly adapting to changing system conditions, such as load harmonic content variations, and are too bulky because they comprise relatively large capacitors and inductors.

Faced with the demand to provide quality power efficiently and at the lowest possible cost, utilities are being forced to seek new solutions to the power quality problems caused by reactive and non-linear loads. With the development of high-power semiconductor switches that have controlled turn-on and turn-off capability, new types of converter-based compensators have become available for use in utility applications.

Various types of converter-based active compensators have been developed in the prior art to provide power quality conditioning, but each of these prior art active or hybrid active/passive techniques has one or more significant drawbacks. In addition, due to their high cost, these devices have not found wide-spread acceptance in utilities. Although the cost of these devices may decrease with higher volume production, it is likely to remain above that of conventional passive controllers. The active compensation methods previously employed and some of the problems associated with them are as follows.

(1) Magnetic flux compensator—requires a high power feedback amplifier and uses sensing circuits that introduce undesirable phase shifts.

(2) Triplen harmonic current injector—can only nullify zero-sequence harmonics and requires a high power rated harmonic generator.

(3) Force-commutated reactive converter—compensation is poor due to the low switching frequency of the force-commutated reactive converter, and switching losses are high.

(4) Self-commutated voltage source active compensator—has excellent filtering characteristics, but it operates at a high switching frequency and uses an inverter that must withstand full line voltage.

(5) Self-commutated current source active compensator—has a higher reliability than its voltage source counterpart, but it also has increased losses.

(6) Advanced static VAR generator—does not provide harmonic distortion compensation, but instead, introduces additional harmonic distortion on the power line.

(7) Resonant active conditioner—requires a high voltage rated switch and is characterized by high conduction losses.

(8) Hybrid compensators including a shunt combination of active and passive filters, and a series active filter combined with a shunt passive filter—the shunt hybrid exhibits a degraded dynamic performance, and the series hybrid requires that the inverter must be protected against system short circuits.

Several of the active power line conditioning devices in the prior art include either current-source or voltage-source inverters that convert a direct current (DC) or a DC voltage into a three-phase output signal that is synchronous with the alternating current (AC) of the power system and which is coupled to the system to provide shunt or series compensation. There are two principle types of inverter switching strategies that are used. In the first of these, a semiconductor device is switched on and off only once during each period of the fundamental frequency waveform. For example, a six-pulse, three-phase inverter produces a quasi-square wave output signal on each positive and negative half cycle, for each phase. However, the square wave compensation signal has an unacceptably high harmonic content.

To achieve better waveform quality and higher power rating, it is common to combine several such six-pulse inverter units so that the output signal comprises multiple pulses that when combined, more closely approximate the positive and negative half cycles of a sine wave. A second type of inverter that produces this type of output signal employs pulse width modulation (PWM). Semiconductor switches in the PWM inverter are turned on and off at a rate substantially higher than the power frequency, creating a chopped output waveform in which the width of the pulses is modulated. The PWM inverter thus shifts the undesirable harmonic content in the output signal to high frequencies, where filtering is possible using relatively small passive components (compared to the passive components required to filter a square wave at the fundamental frequency).

Both the fundamental frequency switching inverter and the PWM inverter exhibit characteristic problems that limit their use by the power industry. The fundamental frequency switching approach requires relatively complex transformer configurations to achieve low waveform distortion. In addition, the low switching frequency constrains the response rate and precludes incorporation of active harmonic filtering. Although the PWM inverter has a relatively fast response time and the ability to eliminate harmonic distortion, its relatively high switching losses and the limited level of its output signal at the fundamental frequency diminish the prospects for its use. Since utilities require high efficiency and high power rating capability, the PWM inverter technology currently fails to evoke much interest.

Based on the foregoing discussion, it will be apparent that the prior art does not include an active power compensator that meets current requirements for efficiency and low cost, but does not exhibit undesirable features. There is thus an opportunity to develop such a power conditioning system.

SUMMARY OF THE INVENTION

In accordance with the present invention, apparatus for actively compensating a reactive power load and a harmonic distortion on an alternating current power line include a stepped-wave inverter that produces a reactive compensation signal for use in dynamically compensating the reactive power load. A PWM inverter produces a harmonic compensation signal on its output terminals for use in compensating the harmonic distortion on the power line. Also included are means for coupling the reactive compensation signal and the harmonic compensation signal to the power line, so that the reactive power load and the harmonic distortion on the power line are compensated by the signals. Because of the novel manner in which the two inverters are coupled to the power line, the voltage level across the output terminals of the PWM inverter is substantially less than the voltage on the power line.

In one preferred form of the invention, the means for coupling comprise an inductor having two terminals, including one terminal that is connected to the power line and another terminal that is connected to the stepped-wave inverter. The terminals of the pulse width modulator are also coupled to the two terminals of the inductor.

The pulse width modulator preferably includes high pass filters for suppressing a switching distortion component of the harmonic compensation signal. Further, the stepped-wave inverter preferably includes a switching network and a capacitor for storing charge for use as a source of a DC voltage that is supplied to the switching network.

A controller for the stepped-wave inverter and the PWM inverter includes means for determining a reactive power of the load and means for monitoring the reactive compensation signal. In addition, the controller includes means for controlling the stepped-wave inverter in response to both the reactive power of the load and the reactive compensation signal, to determine a desired phase shift of the reactive compensator switching signals. Harmonic distortion monitoring means in the controller determine a harmonic distortion on the power line due to the load, and voltage control means adjust a voltage that is applied at the PWM inverter DC terminals. Also included in the controller are means coupled to the harmonic distortion monitoring means, for controlling the voltage control means to adjust the harmonic compensation signal in response to the harmonic distortion on the power line.

In one embodiment, used for series compensation, the means for coupling comprise a transformer having one winding connected in series with the power line and another winding coupled to the pulse width modulated inverter and the stepped-wave inverter. The PWM inverter is capacitively coupled to the other winding of the transformer.

Although the present invention is applicable to a single phase power line, it is more likely to be used in connection with a power line that comprises three phases. In an embodiment of the invention intended for use on a three-phase power line, a separate pulse wave modulator inverter is provided for each of the three phases. In one form of this embodiment, the stepped-wave inverter includes a switching network and a wye-delta winding transformer. Wye windings of the transformer are each coupled between a different one of the three phases and the switching network. Delta windings of the wye-delta winding transformer are also coupled to the switching network. The switching network in this embodiment preferably comprises a plurality of electronic switches connected in parallel with a corresponding plurality of diodes and is coupled to a capacitor that is charged by current from the three phases. The switching network may be gated asymmetrically to compensate for an unbalanced three-phase load.

Since the stepped-wave inverter and the PWM inverters in the present invention are decoupled, the PWM inverter, which operates at a frequency substantially higher than the line frequency, can safely employ a switching network comprising components having a low power and low voltage rating. The stepped-wave inverter, which operates at a much lower frequency, supports most of the stress.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 13 is a graph showing the line voltage, the reactive current flowing through an inductor that couples each PWM inverter and stepped-wave inverter of the present invention to the power line, and a current that is output from each PWM inverter, as a function of time;

FIG. 14 is graph showing the six space vectors output from a six-pulse stepped-wave inverter;

FIG. 15 is a graph showing the six-pulse inverter flux for a symmetrically gated stepped-wave inverter;

FIG. 16 is a graph showing a reference flux and a six-pulse inverter flux for an asymmetrically gated stepped-wave inverter;

FIGS. 19A, 19B, & 19C are block diagrams showing the control scheme for control of an unbalanced load reactive power compensator in accord with the present invention.

DESCRIPTION OF THE PREFERRED EMBODIMENTS

Prior Art Shunt and Series Coupled Inverter Compensators

Figure 1:
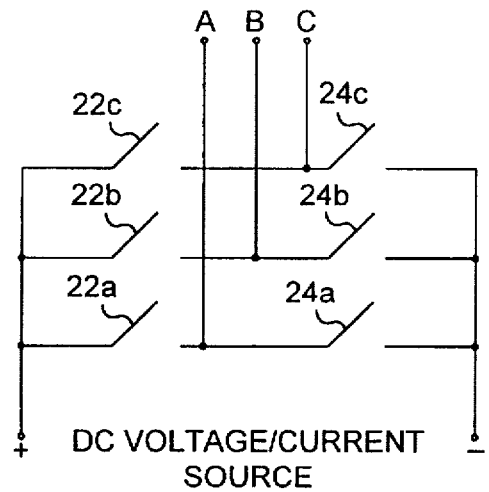
FIG. 1 is a schematic diagram illustrating solid state switches in an inverter (prior art) that might be used for conditioning a power line at either a fundamental or substantially higher switching frequency.

As discussed above in the Background of the Invention, an inverter is a key component of several prior art compensation devices for use in connection with compensating reactive loads or harmonic distortion on a power line. As shown in FIG. 1 (prior art), an inverter circuit for use with a three-phase power system comprises a DC voltage/current source that is selectively coupled to each phase of the power system through one of a plurality of switches. In this Figure, the positive polarity of the DC voltage/current source is selectively connected to phases A, B, and C through switches 22a, 22b, and 22c, respectively. Similarly, the negative polarity of the source is coupled to these three phases through switches 24a, 24b, and 24c, respectively. For use with a voltage source, a GTO in parallel with a diode is typically used for each switch, coupled cathode to anode. For use with a current source, the reverse blocking GTO is used, but the diode is omitted. Instead of the GTOs used in the preferred embodiments, other slow GTO devices could be used such as a MOS controlled thyristor. In an inverter that provides an AC output at the fundamental frequency of the power line, switches 22a–22c are closed once during a portion of each positive half-cycle of voltage waveform for the respective phase of the power system to which the switch is coupled, and switches 24a, 24b, and 24c are closed once during a portion of the negative half-cycle of the voltage waveform on each phase.

Figure 2A:
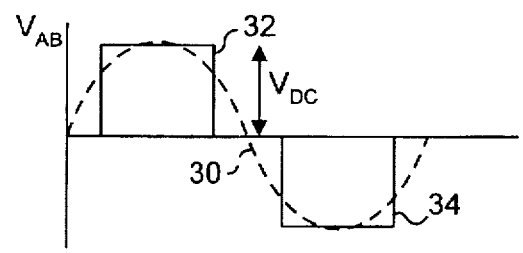
FIG. 2A is a graph showing the output signal of an inverter (prior art) operating at the fundamental frequency, compared to a sinusoidal voltage waveform at the fundamental frequency.

As shown in FIG. 2A, a dash line 30 represents the voltage waveform of one of the phases during one full cycle. A positive square wave pulse 32 is produced by closing a switch coupled to the positive terminal of the voltage/current source, and a negative square wave pulse 34 is produced when the corresponding switch coupled to the negative terminal of the voltage/current source is closed.

The basic prior art six-pulse inverter operating at the fundamental frequency of the power system thus produces the output waveform represented by square wave pulses 32 and 34 for each phase. This quasi-square wave output of this inverter has an unacceptably high harmonic content.

Figure 2B:
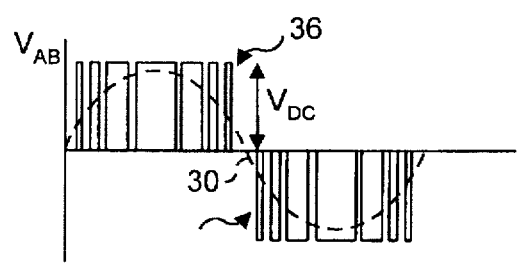
FIG. 2B is a graph showing the output signal of an inverter (prior art) operating at a frequency substantially higher than that of the sinusoidal voltage waveform on the power line.

Alternatively, a PWM technique can be employed to control the semiconductor switches of an inverter so that they turn on and off at a rate considerably higher than the fundamental frequency of the power system. As shown in FIG. 2B, an output waveform 36 is produced by a PWM inverter. This output waveform includes a plurality of pulses of varying width during each half cycle. Waveform 36 shifts the undesirable harmonic content to substantially higher frequencies that can be filtered using much smaller components than is possible for filtering a waveform at the fundamental frequency. However, the PWM approach results in relatively high switching losses and the output that is obtained at the fundamental frequency is somewhat reduced. Accordingly, this technique is less attractive for applications in which high efficiency and high power ratings are required.

Figure 3A:
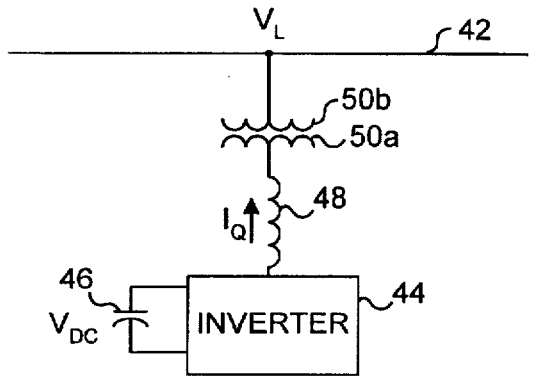
FIG. 3A is a schematic diagram of a three-phase power line with a shunt coupled three-phase inverter (prior art) connected thereto for compensation.

A shunt coupled compensator 40 (prior art) using either the fundamental frequency quasi-square wave pulse output signal or the PWM multiple pulse output signal is shown in FIG. 3A. In this compensator, a inverter 44 is shunt coupled to a power line 42. A capacitor 46 stores charge that serves as a DC voltage source to energize the inverter, which supplies a compensation current $I_Q$ through an inductance 48 to a potential transformer winding 50a. A winding 50b of the transformer is coupled to power line 42.

Figure 3B:
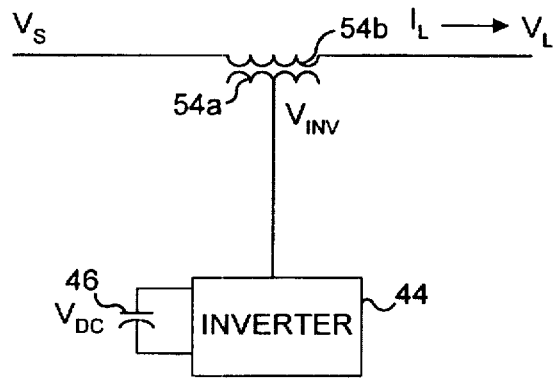
FIG. 3B is a schematic diagram of a three-phase power line with a series coupled three-phase inverter (prior art) connected thereto for compensation.

In FIG. 3B, a series coupled compensator 52 (prior art) is illustrated. In this example, inverter 44 is connected to a winding 54a, thereby supplying an inverter voltage $V_{INV}$ to a transformer winding 54a. Another winding 54b of the transformer is connected in series with a load on the power line so that a compensated voltage $V_L$ is supplied to the load.

Decoupled Shunt Compensator in Accord with Present Invention

The present invention, which is described below, achieves the advantages of both the fundamental frequency and PWM switching methods, while avoiding the drawbacks of each.

Figure 4B:
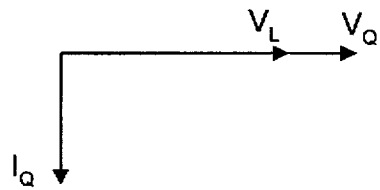
FIGS. 4B and 4C are vector diagrams respectively showing the operation of the stepped-wave inverter in a capacitive mode in which leading current is drawn from the line, and in an inductive mode in which lagging current is drawn from the line by the stepped-wave inverter, to compensate different types of reactive loads.
Figure 4C:
Figure 4A:
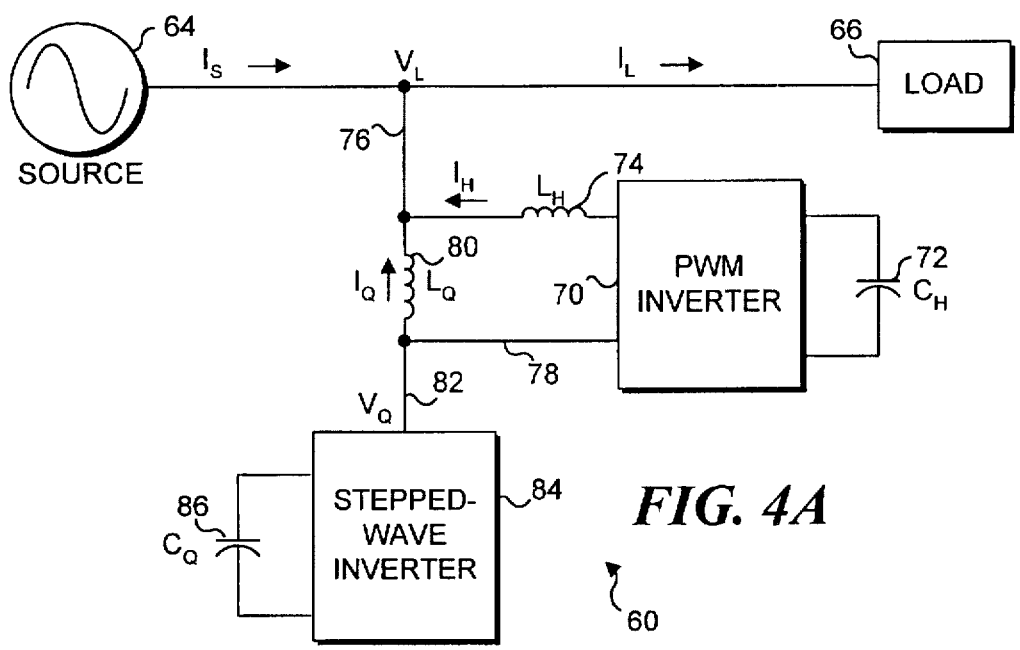
FIG. 4A is a simplistic schematic block diagram showing the present invention shunt coupled to a power line (single phase or three phase) to compensate for harmonic distortion and a reactive load.

As shown in FIG. 4A, a harmonic distortion and reactive load compensator 60 constructed in accordance with the present invention is illustrated that combines both a PWM inverter 70 and a stepped-wave inverter 84. PWM inverter 70 is energized from a DC source comprising a capacitor 72 having a capacitance $C_H$. Similarly, stepped-wave inverter 84 is energized with a DC source comprising a capacitor 86 having a capacitance value $C_Q$. PWM inverter 70 is decoupled from stepped-wave inverter 84, and both are coupled to the power line using an inductor 80. The reactive power of a load 66 on the power line, which is either single-phase or three-phase, is compensated by stepped-wave inverter 84. PWM inverter 70 compensates for harmonic distortion on the power line. An alternating current source 64 supplies either single-phase or three-phase power to load 66 at a voltage $V_L$. The current provided by source 64 is indicated in FIG. 4A by the term $I_S$. Current flowing to load 66 is represented by $I_L$.

In compensator 60, an inductor 74 is connected in series with the output of a PWM inverter 70 to one side of an inductor 80 and PWM inverter 70 is also coupled to the other side of inductor 80 through a lead 78. A lead 82 connects this side of inductor 80 to a stepped-wave inverter 84. Inductor 80 is thus connected in parallel with PWM inverter 70 and in series with stepped-wave inverter 84. A lead 76 couples the common connection between inductors 74 and 80 to the power line.

It will be apparent that PWM inverter 70 is only exposed to the voltage developed across inductor 80, which is substantially less than the full source voltage, $V_L$. In contrast, stepped-wave inverter 84 is exposed to the full potential on the power line. Stepped-wave inverter 84 compensates for the reactive power, either leading or lagging power factor, by producing a reactive power compensating signal having a waveform with a frequency substantially equal to the fundamental frequency of the power line, while PWM inverter 70 compensates for harmonic distortion by producing a harmonic distortion compensating signal using a fast switching network that operates at a frequency substantially greater than the fundamental frequency of the power line, i.e., at a frequency that is greater than the highest harmonic frequency to be compensated.

Stepped-wave inverter 84 and PWM inverter 70 are configured to exploit the respective strengths and minimize the respective weaknesses of the two types of inverters used for these devices. Furthermore, decoupling the PWM and stepped-wave inverters in compensator 60 yields a significant reduction in the voltage and power ratings required for the switching network in PWM inverter 70 to achieve active compensation at lower cost and higher efficiencies than previously provided by prior art active harmonic distortion compensation devices that were required to withstand full line voltage.

As shown in FIG. 4B, stepped-wave inverter 84 operates in a capacitive mode in which it supplies lagging current, $I_Q$, to compensate for a lagging current drawn by the load on the power line. To provide the compensating leading current in this mode of operation, the output voltage of the stepped-wave inverter, $V_Q$, is increased above the power line voltage, $V_L$. Conversely, to operate in the inductive mode as shown in FIG. 4C, the stepped-wave inverter produces an output voltage $V_Q$ that is less than the line voltage so that it supplies a leading current, $I_Q$, which compensates for a leading load current. By adjusting the DC voltage provided by capacitor 86 in response to the phase angle between current and voltage on the power line (i.e. the load power factor), stepped-wave inverter 84 thus provides either a leading or lagging reactive power compensation signal.

To compensate for harmonic distortion on the power line, PWM inverter 70 injects a current $I_H$ into conductor 76 that cancels the harmonic components in load current $I_L$. The current $I_H$ compensates for both the harmonic distortion of the line and the harmonic content of the current $I_Q$ flowing through inductor 80, which is produced by stepped-wave inverter 84. To achieve the harmonic distortion compensation, the voltage of capacitor 72 is maintained at a reference level, which is higher than the peak voltage across inductor 80, thereby insuring proper control over the output current $I_H$ provided by the PWM inverter.

It should be noted that the voltage across inductor 80 is equal to the difference between the power line voltage $V_L$ and the output voltage from stepped-wave inverter 84, $V_Q$. This differential voltage is relatively small, depending upon the number of pulses used in the stepped-wave inverter. Consequently, as noted above, PWM inverter 70 operates at a substantially reduced voltage rating compared to conventional PWM converters, which are typically subjected to full system power line voltage. Although the details of a single phase compensator are not specifically shown, the present invention can be used on a single-phase power line to provide both reactive load compensation and harmonic distortion compensation.

Figure 5:
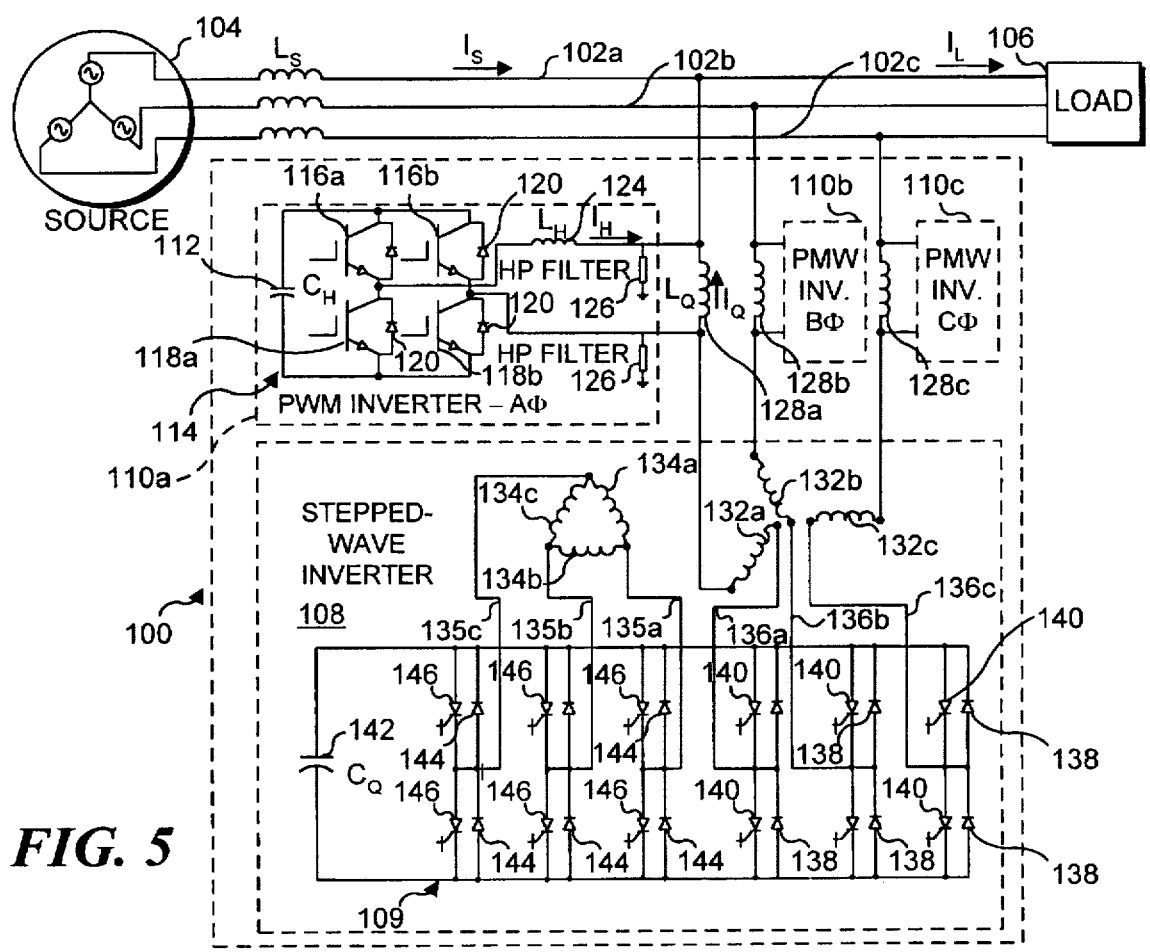
FIG. 5 is a more detailed schematic diagram illustrating a three-phase power line with a first embodiment of the present invention shunt coupled thereto to compensate both harmonic distortion and a reactive load.

Details of a first embodiment of a three-phase shunt coupled reactive power and harmonic distortion compensator 100 are illustrated in FIG. 5. As shown in this Figure, a three-phase power line comprising conductors 102a, 102b, and 102c carries three-phase current from a source 104 to a three-phase load 106. The current provided by source 104, $I_S$, flows through series inductors $L_S$, which represents the line impedances. The current provided to load 106, $I_L$, exhibits the reactive effect of load 106, while the reactive compensation provided by compensator 100 is evident upstream of the point at which the compensator is connected to the three-phase power line.

Compensator 100 comprises a three-phase stepped-wave inverter 108 and three PWM inverters 110a, 110b, and 110c. One of the three PWM inverters is respectively provided for a different one of the phases A, B, and C of the three-phase power line. Only details of PWM inverter 110a that is applied to the A phase are illustrated in FIG. 5, it being understood that each of the other PWM inverters for the B phase and C phase are substantially identical.

PWM inverter 110a employs a DC signal provided from charge stored on a capacitor 112, which is also identified by $C_H$ in the FIGURE. The positive side of capacitor 112 is coupled to the collectors of two insulated gate bipolar transistors (IGBTs) 116a and 116b. Instead of these IGBTs, other fast GTO devices could be used, such as MOSFETs or power transistors. A diode 120 is connected between the emitter and collector of each of these two transistors. The emitter of transistor 116a is connected through an inductor 124, having an inductance value $L_H$, to the line side terminal of an inductor 128a, i.e., to the terminal of inductor 128a that is coupled to conductor 102a. The emitter of transistor 116b is connected to the opposite terminal of inductor 128a, which is also coupled to stepped-wave inverter 108.

The negative terminal of capacitor 112 is connected to emitters of two other IGBTs 118a and 118b and to the anodes of two diodes 120 that are connected in parallel with these two transistors. The collector of transistor 118a and the cathode of one of these diodes are connected to the emitter of transistor 116a and to inductor 124, while the collector of transistor 118b and the cathode of the other diode are connected to the emitter of IGBT 116b. Diodes 120 provide full wave rectification for the AC voltage appearing across inductor 128a to charge capacitor 112. The DC voltage provided by capacitor 112 serves as a power source for PWM inverter 110a. The amplitude and shape of the harmonic distortion compensation signal produced by PWM inverter 110a is determined as a function of the gate voltages supplied to the insulated gates of IGBT transistors 116a, 116b, 118a, and 118b. A high pass filter 126 is coupled to ground from the common connection between inductor 124 and inductor 128a, and also from the common connection between the emitter of IGBT transistor 116b, the collector of IGBT transistor 118b, and the terminal of inductor 128a.

In compensator 100, stepped-wave inverter 108 includes a wye winding 132 and a delta winding 134 that are used for providing phase shifting of signals applied to a switching network 109 comprising a plurality of six-pulse switching devices. Switching network 109 is energized by a DC voltage supplied by a capacitor 142, which is also identified by $C_Q$. In this preferred embodiment of the stepped-wave inverter, the switching devices comprise a plurality of GTOs 140 and 146. Three wye windings 132a, 132b, and 132c are electromagnetically coupled to three delta windings 134a, 134b, and 134c. One end of wye winding 132a is coupled to conductor 102a of the three-phase power line through inductor 128a. Similarly, one end of each of windings 132b and 132c are respectively coupled through conductors 128b and 128c to conductors 102b and 102c of the power line. Switching network 109 also includes six diodes 138 connected in parallel with six GTOs 140, anode to cathode, and six diodes 144 connected in parallel with six GTOs 146, anode to cathode. Two GTO/diode pairs 146/144 are connected in series with two GTO/diode pairs 146/144 in three parallel paths that extend between the positive and negative terminals of capacitor 142. Similarly, two GTO/diode pairs 140/138 are connected in series in three parallel paths that also are in parallel with capacitor 142. The common connection between two GTO/diode pairs is connected through a line 136a to wye winding 132a. Similarly, common connections between the two other series connected pairs of GTOs 140 and diodes 138 are connected through lines 136b and 136c, respectively, to wye windings 132b and 132c.

A common connection between delta windings 134a and 134c is connected to the common connection between two of the series connected pairs of GTOs 146 and diodes 144. Similarly, the other two remaining common connections between the series connected GTO/diode pairs 146/144 are connected through lines 135a and 135b to the common connections between delta windings 134b and 134c, and 134a and 134b. Diodes 138 and 144 provide full-wave rectification for charging capacitor 142. The DC voltage stored on capacitor 142 provides a power source for stepped-wave inverter 108.

Since the wye-delta coupled windings 132/134 generate waveforms at thirty degree increments, stepped-wave inverter 108 comprises a 12-step inverter. By properly controlling the gates of GTOs 140 and 146, the level of the voltage $V_Q$ developed by the stepped-wave inverter and thus the leading or lagging relationship of the current $I_Q$ produced thereby is controlled to compensate for the reactance of load 106.

Alternative Stepped-Wave Inverter

Figure 6:
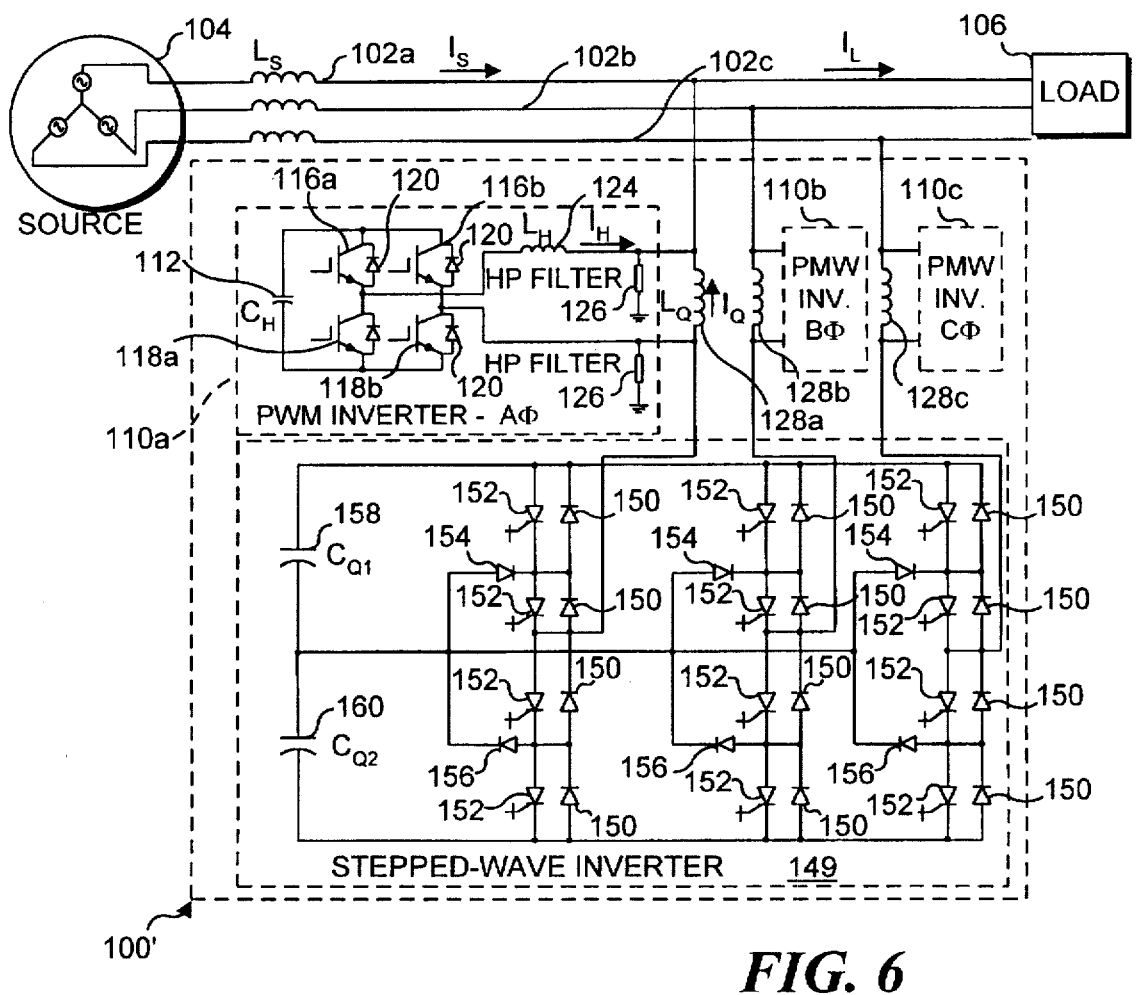
FIG. 6 is a schematic diagram illustrating a three-phase power line with a second embodiment of the present invention shunt coupled thereto to compensate both harmonic distortion and a reactive load.

A compensator 100' is shown in FIG. 6 that is identical in all respects to compensator 100, except that it includes an alternative stepped-wave inverter 149 in which the wye-delta windings of stepped-wave inverter 108 are omitted to achieve a substantial cost reduction. Instead, stepped-wave inverter 149 comprises a 12-step inverter employing a tapped DC source. The tapped DC source comprises a capacitor 158, also identified by the reference $C_{Q1}$ connected in series with a capacitor 160, which is further identified by the reference $C_{Q2}$. The common connection between capacitors 158 and 160 provides an intermediate DC voltage for supplying the switching network. The switching network comprise a plurality of parallel connected GTOs 152 and diodes 150, connected anode to cathode. Four of the GTO/diode pairs are connected in series for each phase of the three-phase power line. Compensator 100' also includes three PWM inverters 110a, 110b, and 110c, which are configured as described above, in connection with compensator 100.

In stepped-wave inverter 149, the common connection between capacitors 158 and 160 is coupled to the anodes of three diodes 154 and to the cathodes of three diodes 156. The cathodes of the three diodes 154 are connected to the common connections between the first (top) two pairs of GTOs and diodes 152/150 on each phase, and the anodes of diodes 156 are connected to the common connection the last (bottom) pairs of GTOs and diodes for each phase. The configuration shown for stepped-wave inverter 149 can be extended to provide additional pulses by adding additional pairs of GTOs 152 and diodes 150 and a further capacitor $C_{QN}$ in an analogous fashion. As additional pulses are provided in a stepped-wave inverter for generating the reactive compensation signal, less harmonic distortion is introduced in the compensating current $I_Q$ by the stepped-wave inverter.

A further modification that can optionally be made to either compensator 100 or compensator 100' is to employ a three-phase PWM inverter instead of using separate PWM inverters 110a, 110b, and 110c for each of the three phases. However, if a three-phase PWM inverter is used, it must be coupled to inductors 128a, 128b, and 128c through a transformer that provides isolation for each of the phases of the three-phase line.

Shunt Compensator Control

Figure 8:
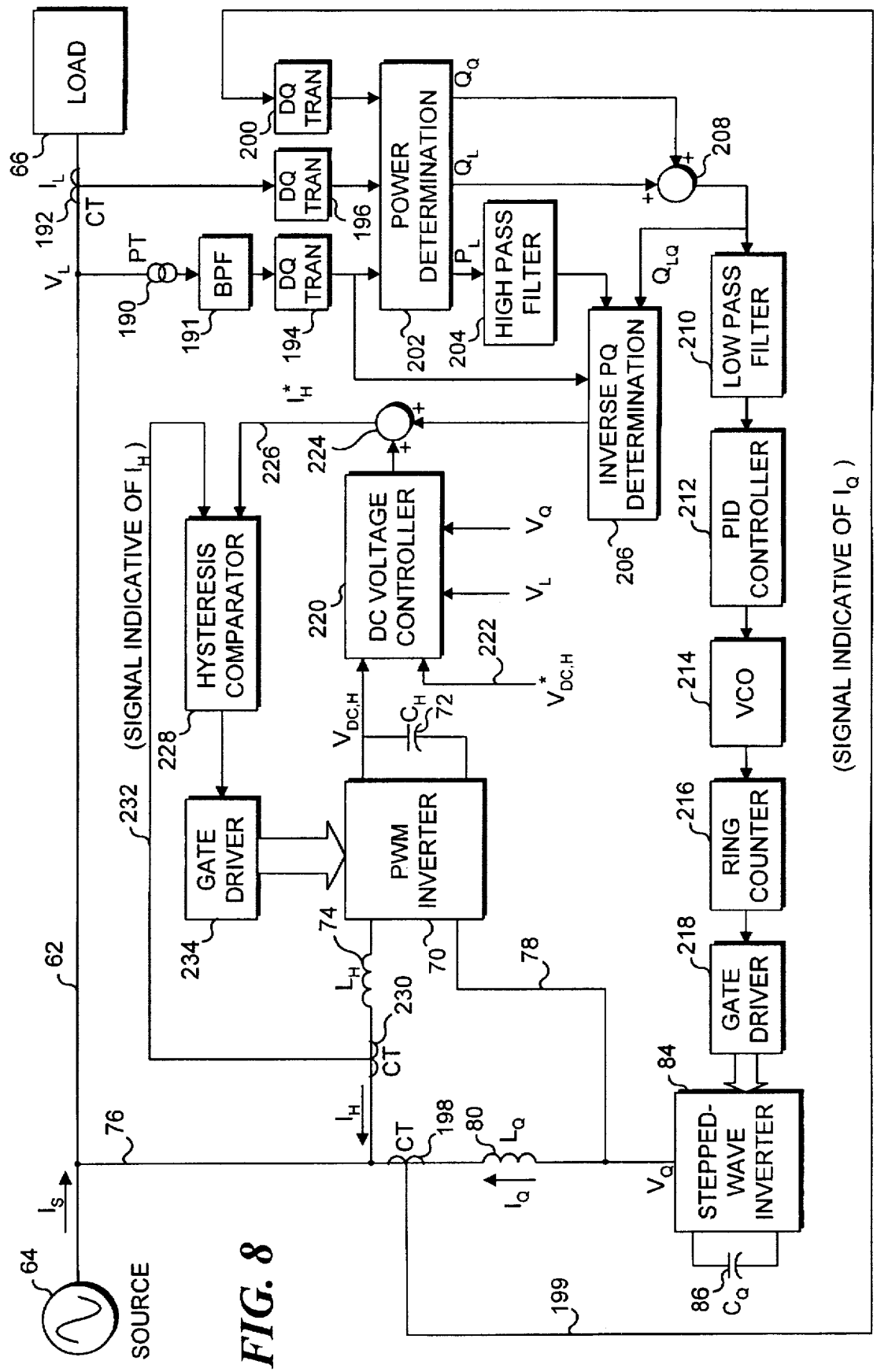
FIG. 8 is a schematic block diagram of the present invention (shunt coupled embodiment) illustrating components of a control for the present invention.

Referring now to FIG. 8, a block diagram illustrates the functional components comprising a control for compensator 100 (or 100'). For purposes of simplification, details of the control are only illustrated for a single phase in FIG. 8. Thus, only a single current transformer (CT) 192 is shown to monitor the current $I_L$ provided to load 66. For a three-phase power line, a separate CT 192 would be provided for each phase. Similarly, a potential transformer (PT) 190 monitors the voltage $V_L$ applied to load 66. On a three-phase system, a separate PT 190 might be provided for each phase. The secondary winding of PT 190 is coupled through a fundamental frequency band pass filter (BPF) 191, to a block 194, which implements a DQ transformation, yielding two orthogonal components for the voltages. Similarly, the secondary winding of CT 192 is applied to a DQ transformation block 196 for determination of two orthogonal components for the load currents.

For each phase, a CT 198 monitors the current $I_Q$ provided by stepped-wave inverter 184 to compensate the reactive load, producing a signal that is input to a DQ transformation block 200. The values determined by DQ transformation blocks 194, 196, and 200 are input to a power determination block 202. In addition, the output of DQ transformation block 194 is applied to an inverse PQ determination block 206.

Power determination block 202 uses the DQ values input to it to determine an instantaneous real power $P_L$ for the load which is input to a high pass filter block 204. In addition, the power determination block determines an instantaneous imaginary power consumed by the load, $Q_L$, and an imaginary instantaneous power, $Q_Q$, corresponding to the power provided by stepped-wave inverter 84 as current $I_Q$. The signals corresponding to $Q_L$ and $Q_Q$ are added by an adder block 208, producing a signal that is input both to a low pass filter 210 and to inverse PQ determination block 206. The sum of these two values is represented by $Q_{LQ}$. The value of $Q_{LQ}$ corresponds to the reactive compensation error, which ideally, should be equal to zero. The output of high pass filter block 204 corresponds to the instantaneous load harmonic real power component, $\tilde{P}_L$.

The output of low pass filter block 210 is input to a proportional-integral-derivative (PID) controller block 212. In response, the PID controller block produces a signal that is input to a voltage controlled oscillator (VCO) block 214. As a function of the amplitude of the input signal, VCO block 214 produces a pulse output signal, the frequency of which increases as the amplitude of the input voltage increases. A ring counter block 216 receives the pulse output signal from VCO block 214, and as a function of the frequency of the pulse output signal, produces a series of gating signals that are input to a gate driver block 218. Gate driver block 218 provides gate drive signals that are applied to the gates of each of the GTOs comprising the switching network in stepped-wave inverter 84. Thus, stepped-wave inverter 84 is controlled so as to minimize the reactive error $Q_{LQ}$ that is input to low pass filter block 210 from adder block 208. In response to a non-zero value for $Q_{LQ}$, stepped-wave inverter 84 adjusts the voltage $V_Q$ of its output signal, thereby modifying the lead/lag relationship of $I_Q$ applied to a power line 62 so as to minimize the error. The DC voltage source for PWM inverter 70 is capacitor 72 (also identified by $C_H$). This DC voltage level is input to a DC voltage controller 220 and compared to a predefined reference level $V^*_{DC,H}$ that is applied from a reference voltage source (not shown) on a line 222. The voltage controller is used to compensate for losses in PWM inverter 70 that occur due to leakage in capacitor 72 and because of the power loss incurred in the IGBTs used for switching in the PWM inverter. An output signal corresponding to the difference between the desired value for the voltage across capacitor 72 and its actual value is input to an adder 224, along with the output signal from inverse PQ determination block 206. The output of inverse PQ determination block 206 corresponds to the instantaneous value for current that must be added to the actual current on power line 62 to compensate for harmonic distortion on the power line caused by load 66, and for harmonic distortion introduced in the output signal, $I_Q$, from stepped-wave inverter 84. The output signal from the inverse PQ determination block is added to the error signal output from DC voltage controller 220, producing a desired value for the current produced by PWM inverter 70. This desired value, which is represented by $I^*_H$, is input to a hysteresis comparator block 228 for comparison against a signal corresponding to $I_H$, the actual current produced by PWM inverter 70; this signal is supplied from a CT 230 that monitors the actual current $I_H$ supplied by PWM inverter 70 to power line 62. Comparison of the signal indicative of $I_H$ with the desired value for the signal produces an output from hysteresis comparator 228 that is input to a gate driver block 234. Gate driver block 234 develops the gating signals applied to the gates of each of the IGBTs comprising PWM inverter 70, thereby controlling the conductance of the IGBTs so that the value of $I_H$ is adjusted to meet the desired value provided by adder block 224.

Figure 9:
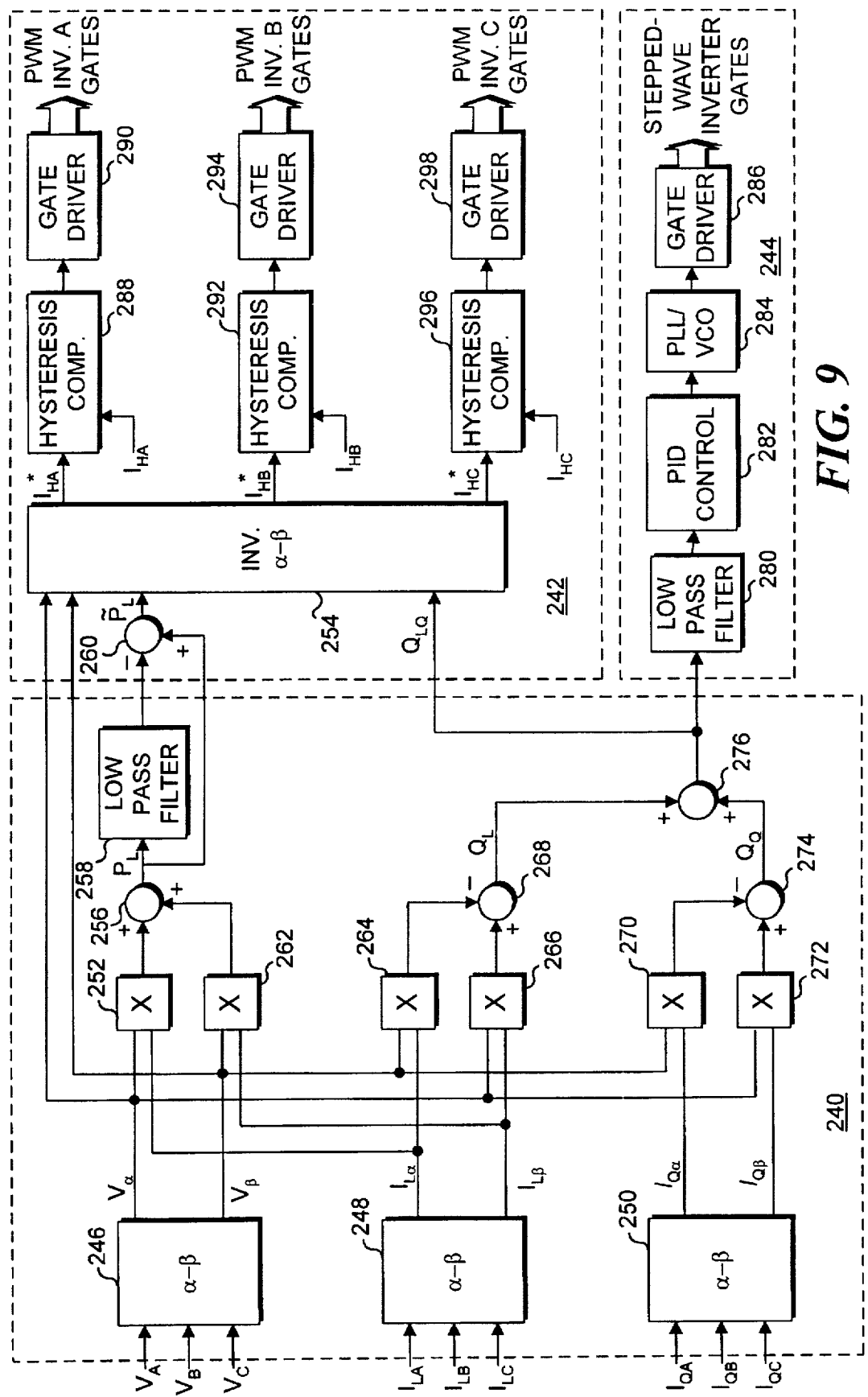
FIG. 9 is a schematic block diagram showing how signals input to the control are processed to develop gate signals used to control each PWM inverter and the stepped-wave inverter of the present invention.

Further details of the control scheme used in connection with compensators 100 or 100' are illustrated in the block diagram shown in FIG. 9. The control includes a sensing and instantaneous power determination block 240, a PWM inverter control block 242, and a stepped-wave inverter control block 244. Referring first to the sensing and instantaneous power determination block 240, in a block 246, the supply voltage on each of the phases of the three-phase line, $V_A$, $V_B$, and $V_C$ are transformed to orthogonal $\alpha$ and $\beta$ coordinates according to the following:

$$\begin{bmatrix} V_\alpha \\ V_\beta \end{bmatrix} = \sqrt{\frac{2}{3}} \begin{bmatrix} 1 & -1/2 & -1/2 \\ 0 & \sqrt{3}/2 & -\sqrt{3}/2 \end{bmatrix} \begin{bmatrix} V_A \\ V_B \\ V_C \end{bmatrix} \quad (1)$$

Similarly, load currents for each phase of the three-phase line represented by $I_{LA}$, $I_{LB}$, and $I_{LC}$ are converted to orthogonal $\alpha$ and $\beta$ coordinates, $I_{L\alpha}$ and $I_{L\beta}$ based on the following:

$$\begin{bmatrix} I_{L\alpha} \\ I_{L\beta} \end{bmatrix} = \sqrt{\frac{2}{3}} \begin{bmatrix} 1 & -1/2 & -1/2 \\ 0 & \sqrt{3}/2 & -\sqrt{3}/2 \end{bmatrix} \begin{bmatrix} I_{LA} \\ I_{LB} \\ I_{LC} \end{bmatrix} \quad (2)$$

The values for the voltage and current orthogonal coordinates output from blocks 246 and 248 are applied to multiplier blocks 252, 262, 264, and 266 as shown in FIG. 9. The output for multiplier blocks 252 and 262 are input to an adder block 256, while the output from multiplier blocks 264 and 266 is applied to a subtraction block 268. The instantaneous real power, $P_L$, and the instantaneous imaginary power, $Q_L$, drawn by the load, are given by:

$$\begin{bmatrix} P_L \\ Q_L \end{bmatrix} = \begin{bmatrix} V_\alpha & V_\beta \\ -V_\beta & V_\alpha \end{bmatrix} \begin{bmatrix} I_{L\alpha} \\ I_{L\beta} \end{bmatrix} \quad (3)$$

corresponding to the output of adder block 256 and subtraction block 268. The instantaneous real power signal, $P_L$, is applied to a low pass filter block 258 and to a subtraction block 260. In the subtraction block, the output of the low pass filter block, corresponding to an average DC component of the real power $\bar{P}_L$, is subtracted from the instantaneous real power signal. As indicated by the following, the difference between the instantaneous real power and average real power yields a time varying or alternating component $\tilde{P}_L$, which is input to an inverse $\alpha$-$\beta$, block 254.

$$P_L = \bar{P}_L + \tilde{P}_L \quad (4)$$

A similar relationship between the instantaneous imaginary power, $Q_L$, drawn by the load and its average and time varying components, as provided by the following:

$$Q_L = \bar{Q}_L + \tilde{Q}_L \quad (5)$$

The average components, $\bar{P}_L$ and $\bar{Q}_L$, correspond to conventional active and reactive power components. In contrast, alternating components, $\tilde{P}_L$ and $\tilde{Q}_L$, are caused by load unbalance and harmonics. The present invention compensates for $\tilde{P}_L$, $\bar{Q}_L$ and $\tilde{Q}_L$ locally, while average real power, $\bar{P}_L$, is provided by the three-phase power line source.

The current through each of the three inductors that couple the PWM inverters and the stepped-wave inverters to each of the phases of the power line are monitored as noted above, providing an input to a block 250 used to determine corresponding orthogonal alpha and beta coordinates for these three current values. These orthogonal values, $I_{Q\alpha}$ and $I_{Q\beta}$ are determined from the following:

$$\begin{bmatrix} I_{Q\alpha} \\ I_{Q\beta} \end{bmatrix} = \sqrt{\frac{2}{3}} \begin{bmatrix} 1 & -1/2 & -1/2 \\ 0 & \sqrt{3}/2 & -\sqrt{3}/2 \end{bmatrix} \begin{bmatrix} I_{QA} \\ I_{QB} \\ I_{QC} \end{bmatrix} \quad (6)$$

The signals corresponding to these two orthogonal α and β values for current are input to multiplier blocks 270 and 272, along with the corresponding orthogonal voltage values provided by block 246. A subtraction block 274 determines a value $Q_Q$ by subtracting the output for multiplier block 270 from the output of multiplier block 272. The real and imaginary components of the reactive power supplied by the stepped-wave inverter in the present invention are determined as follows:

$$\begin{bmatrix} P_Q \\ Q_Q \end{bmatrix} = \begin{bmatrix} V_\alpha & V_\beta \\ -V_\beta & V_\alpha \end{bmatrix} \begin{bmatrix} I_{Q\alpha} \\ I_{Q\beta} \end{bmatrix} \quad (7)$$

The following Equations 8 and 9 express the relationship between the average and time varying real and imaginary components of the reactive power:

$$P_Q = \bar{P}_Q + \tilde{P}_Q \quad (8)$$

$$Q_Q = \bar{Q}_Q + \tilde{Q}_Q \quad (9)$$

The signals from subtraction blocks 268 and 274 are applied to an adder block 276 in section 240 of the controller, producing the value $Q_{LQ}$, which corresponds to the error of the stepped-wave inverter in compensating for the reactive load. This signal is applied to block 254 in PWM inverter control block 242, and to a low pass filter 280 in stepped-wave inverter control block 244. Low pass filter 280 produces an average value for $Q_{LQ}$ that is input to a PID control block 282. The signal output by PID control block 282 is applied to a phase lock loop(PLL)/VCO block 284. The output signal from PLL/VCO block 284 is applied to a gate driver block 286 to control the phase shift of the stepped-wave inverter output signal, as noted above.

Referring now to PWM control section 242 in FIG. 9, block 254 determines the desired or reference values for controlling each PWM inverter (for the three phases) of the power line by determining values for $I^*_{HA}$, $I^*_{HB}$, and $I^*_{HC}$. These values are determined from:

$$\begin{bmatrix} I^*_{HA} \\ I^*_{HB} \\ I^*_{HC} \end{bmatrix} = \sqrt{\frac{2}{3}} \begin{bmatrix} 1 & 0 \\ -1/2 & \sqrt{3}/2 \\ -1/2 & -\sqrt{3}/2 \end{bmatrix} \begin{bmatrix} V_\alpha & V_\beta \\ -V_\beta & V_\alpha \end{bmatrix}^{-1} \begin{bmatrix} \tilde{P}_L \\ Q_L - Q_Q \end{bmatrix} \quad (10)$$

Since the PWM inverter functions as a tolerance band controller, the current injected into each phase of the power line is compared to the reference for desired current level determined by Equation 10 in hysteresis comparison blocks 288, 292, and 296. The result of this comparison is a signal that is input to each of gate driver blocks 290, 294, and 298 to produce the gate signals input to the PWM inverter coupled to each phase of the power line.

For 12-pulse operation, the DC voltage $V_{DC,Q}$ output from stepped-wave inverter 84 is approximately determined as follows:

$$V_{DC,Q} \cong \frac{\pi}{2\sqrt{6}} V_L \quad (11)$$

For a balanced sinusoidal AC waveform, the stepped-wave inverter operates by circulating energy among the three phases. The capacitor that provides the DC source signal is sized so that its peak-to-peak voltage ripple is limited to approximately 0.1 p.u. The current through the inductor coupling the stepped-wave inverter to the power line in each phase includes a 12-pulse ripple component. Based upon the variation in stored energy required of the capacitor, the capacitance of the capacitor used for the source of DC voltage applied to the stepped-wave inverter is approximately given by:

$$C_Q \cong \frac{0.39 I_Q}{F_1 V_L} \quad (12)$$

To insure proper control over the current, $I_H$, produced by each PWM inverter, the DC link voltage (i.e., the voltage drop across inductor 80) should be at least twice the maximum value of $(V_L - V_Q)$. The maximum value of the difference between the 12-step waveform produced by the stepped-wave inverter and its fundamental component is $V_{DC,Q}/2$, yielding the following:

$$V_{DC,H} \cong V_{DC,Q} \cong \frac{\pi}{2\sqrt{6}} V_L \quad (13)$$

Capacitor 72, which provides the source of DC for the PWM inverter, is chosen so as to limit the current ripple for $I_H$ to 0.1 p.u. Based on this consideration, the capacitance of capacitor 72, where n is the number of pulses, is defined by:

$$C_H = \sum_n \frac{\sqrt{2} I_n}{0.2 V_{DC,H} F_n} \quad (14)$$

In selecting the appropriate size for inductor 74, which is connected in series with the output current provided by PWM inverter 70 (see FIG. 8), the value of the inductance $L_H$ is primarily determined by the switching frequency of the PWM inverter and the tolerance band of the injected current, $I_H$, based on the following relationship:

$$L_H \cong \frac{V_{DC,H}}{2\Delta I_H F_{sw}} \quad (15)$$

Figure 11:
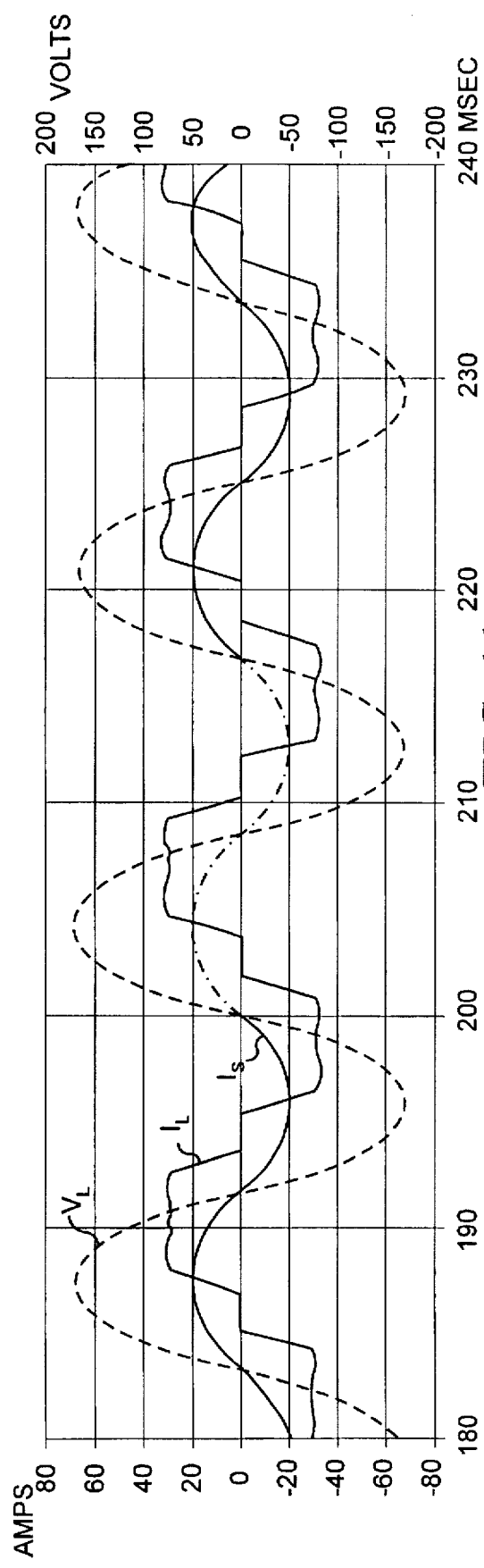
FIG. 11 is a graph showing the line voltage applied to a load, the load current, and the source current, for a gate turn off (GTO) thyristor load, as a function of time.
Figure 12:
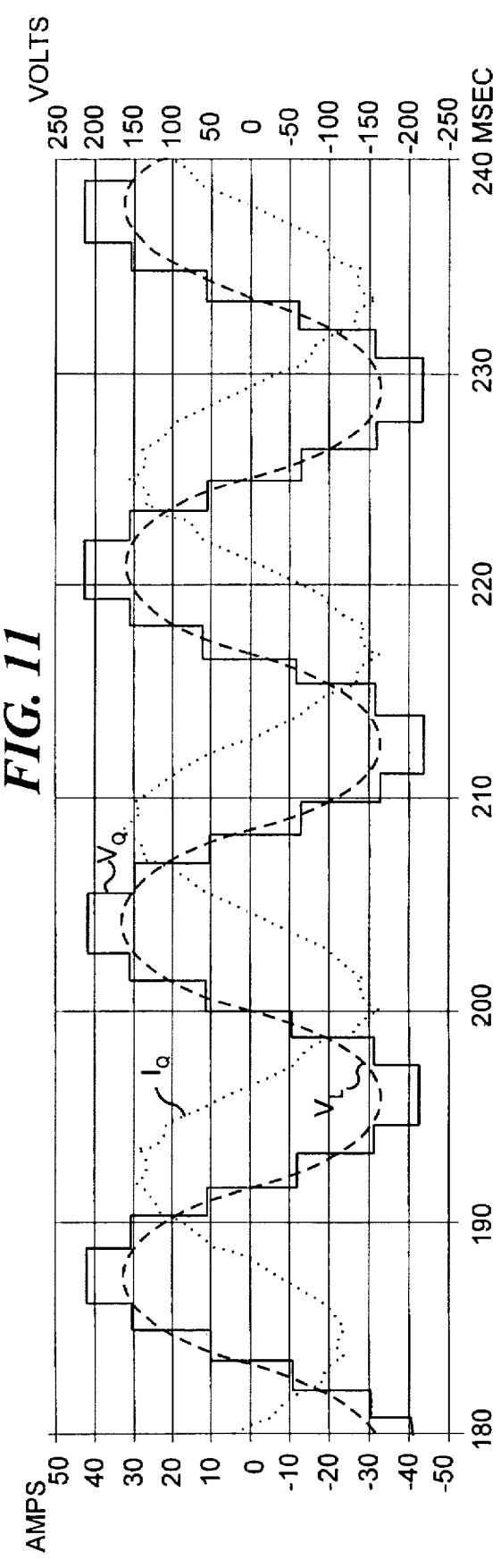
FIG. 12 is a graph showing the line voltage, an output voltage from the stepped-wave inverter used to compensate for reactive power of the load, and a reactive current flowing through an inductor that couples each PWM inverter and the stepped-wave inverter to the power line, as a function of time.

FIGS. 11, 12, and 13 illustrate voltage and current waveforms for a simulated application of the present invention under steady state condition, in regard to a single phase. In FIG. 11, the voltage across the load $V_L$ and the load current $I_L$ for a load comprising a GTO are graphed for several cycles. This Figure also shows that after reactive compensation is applied, the supply current $I_S$ is substantially in phase with the voltage across the load. Due to the nature of the control rectifier load, the current drawn by the load exhibits a phase shift relative to the voltage across the load and creates a substantial harmonic distortion on the power line.

In FIG. 12, the output voltage $V_Q$ produced by the stepped-wave inverter is shown, along with the voltage across the load and the current $I_Q$ flowing through inductor 80. The current $I_Q$ compensates for the reactive component of the load current. Referring to FIG. 13, the current produced by the PWM inverter $I_H$ compensates for the harmonic distortion of the load and for the harmonic content of the current $I_Q$, as will be apparent by inspection of the waveform for the current $I_S$ in FIG. 11. Although the waveform of the current $I_S$ drawn in FIG. 11 is somewhat smoother than the actual result of the simulation, the actual waveform produced by the simulation is substantially sinusoidal and in phase with the voltage across the load represented by waveform $V_L$.

Further tests of the present invention in the laboratory based on a 208 volt, 3 KVA, three-phase prototype have further demonstrated its feasibility. Results of these tests are generally consistent with those shown in FIGS. 11–13. In addition, although the results of these tests are not included in the drawings, the prototype exhibited relatively good dynamic response to changes in the load.

Figure 7:
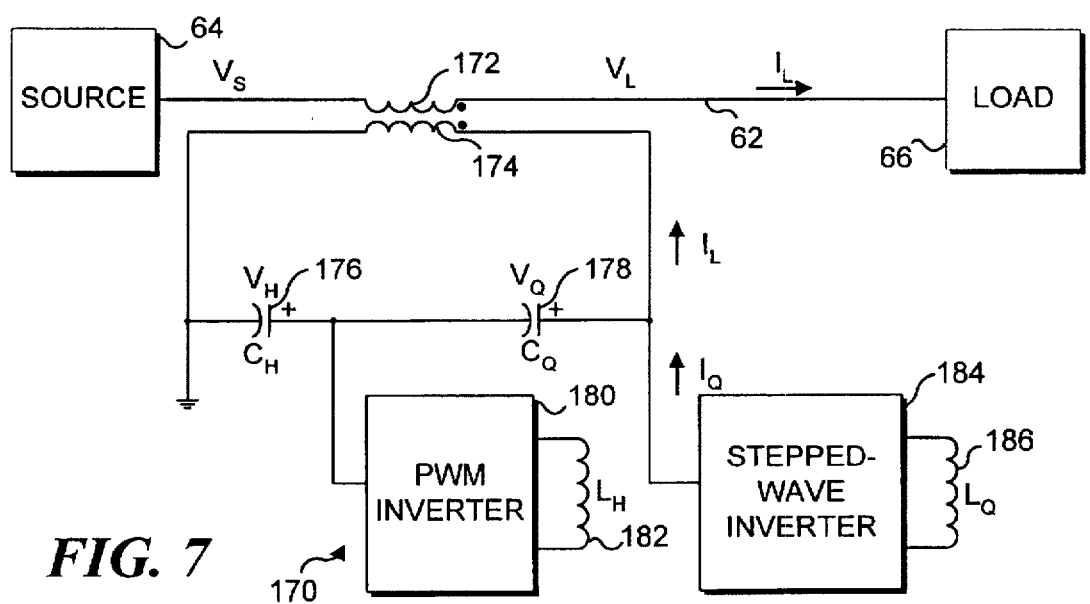
FIG. 7 is a simplified schematic diagram showing the present invention series coupled to a power line (either single phase or three phase) to compensate harmonic distortion and provide voltage regulation.

Decoupled Series Compensator in Accord with the Present Invention In FIG. 7, a simplified block diagram illustrates a decoupled series reactive power and harmonic distortion compensator 170 in accordance with the present invention. As shown in this Figure, compensator 170 is applied for compensation on either a single-phase or three-phase power line coupled to source 64. Again, compensator 170 includes a PWM inverter 180 (for each phase) and a stepped-wave inverter 184 that respectively provide harmonic distortion compensation and voltage regulation, but which are decoupled. PWM inverter 180, which operates at relatively high frequency, can thus be constructed using components having a relatively low power and voltage rating. In contrast, stepped-wave inverter 184 provides reactive compensation and supports most of the stress applied to compensator 170.

Compensator 170 includes two series connected capacitors 176 and 178, also identified by $C_H$ and $C_Q$, respectively. A voltage $V_H$ appears on capacitor 176, and a voltage $V_Q$ appears across capacitor 178. The PWM inverter is coupled to the common connection between capacitors 176 and 178, and stepped-wave inverter 184 is connected to the other side of capacitor 178.

Operation of stepped-wave inverter 184 in this embodiment is best understood by shorting capacitor 176. Stepped-wave inverter 184 provides a current $I_Q$ which is in phase with the current $I_L$ supplied to load 66. By varying the magnitude of $I_Q$, the voltage developed across capacitor 178, $V_Q$, is changed in quadrature with the line current. If the amplitude of $I_Q$ is less than $I_L$, compensator 170 acts as a series capacitor. However, if $I_Q$ exceeds the magnitude of $I_L$, compensator 170 behaves as a series inductor. Real power losses in the inverter are replenished by maintaining an appropriate phase control difference between the inverter output current and the current supplied to load 66. Control of voltage $V_Q$ is achieved by phase angle control to modify the DC current of the stepped-wave inverter and thereby control the magnitude of its output current.

PWM inverter 180 is controlled to develop the voltage $V_H$ sufficient to cancel both the harmonic distortion in the source voltage, $V_S$, and in addition, the harmonic distortion in the voltage $V_Q$, which is introduced by stepped-wave inverter 184. The current in an inductor 182 that is coupled to PWM inverter 180 is maintained at a reference value by allowing adequate real power to flow into the PWM inverter. The current handled by PWM inverter 180 corresponds to the difference between the current supplied to the load $I_L$, and the current output from stepped-wave inverter 184. The differential between these two currents is relatively small, depending upon the pulse number of the stepped-wave inverter. Accordingly, PWM inverter 180 has a relatively low current rating. In contrast, conventional active series compensators are subject to full line current and must provide full fundamental frequency voltage regulation.

Figure 10:
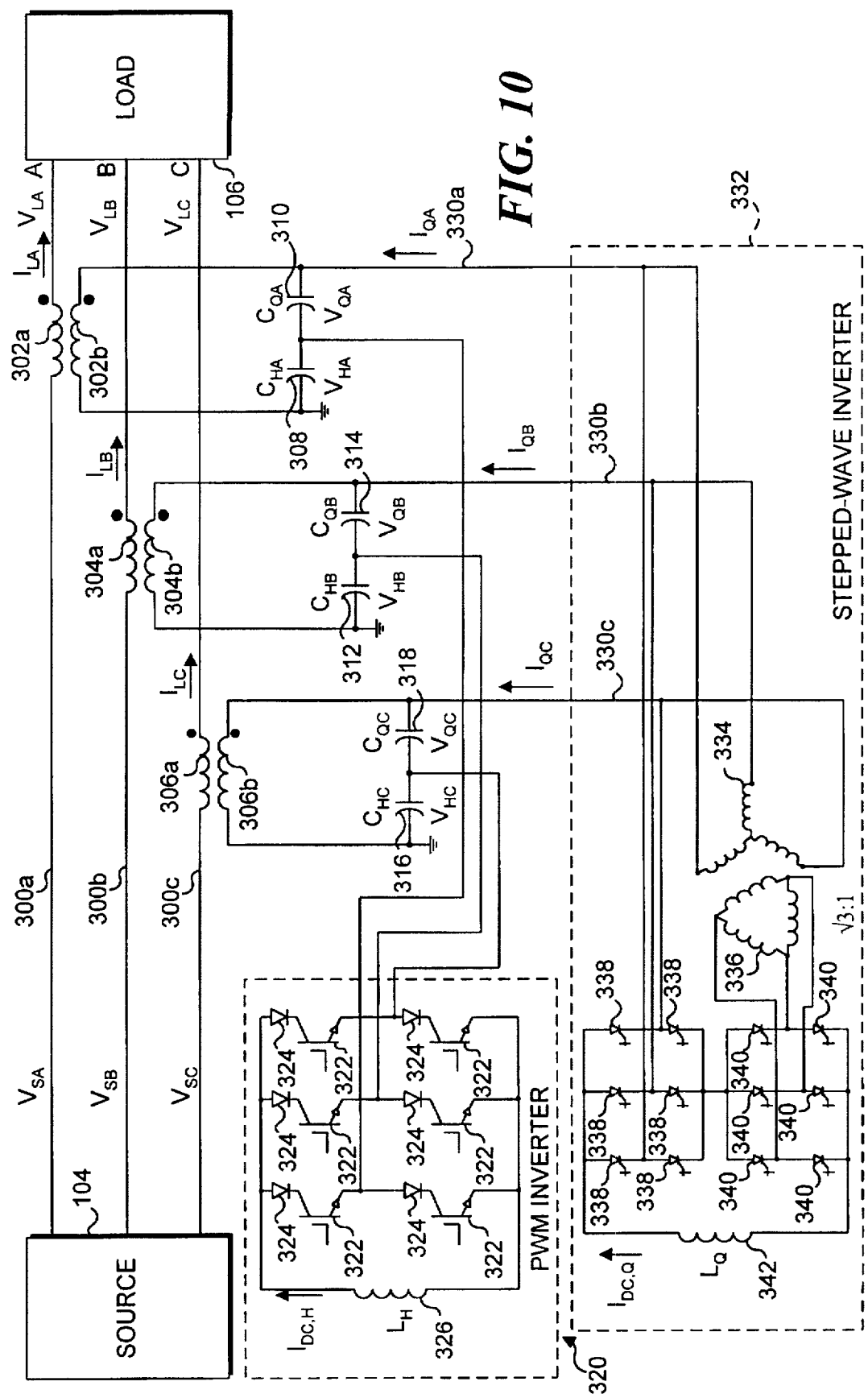
FIG. 10 is a schematic block diagram showing further details of the embodiment of the present invention that is series coupled to a three-phase power line.

Further details of compensator 170, as applied to a three-phase power line that includes conductors 300a, 300b, and 300c, are illustrated in FIG. 10. As shown in this Figure, three-phase source 104 provides voltages $V_{SA}$, $V_{SB}$, and $V_{SC}$ on the corresponding A, B, and C phases. Transformers 302, 304, and 306 are respectively coupled to conductors 300a, 300b, and 300c to control the current and voltage applied to load 106, compensating for harmonic distortion and providing voltage regulation. A voltage $V_{LA}$ and a current $I_{LA}$ are provided on the A phase connection to load 106, a voltage $V_{LB}$ and a current $I_{LB}$ are applied on the B phase to load 106, and a voltage $V_{LC}$ and current $I_{LC}$ are applied on the C phase to the load. The current transformers used to series couple compensator 170 to the three-phase line include windings 302a, 304a, and 306a for phases A, B, and C, respectively. A winding 302b of transformer 302 is coupled across series connected capacitors 308 and 310. Similarly, capacitors 312 and 314 are series connected across a winding 304b of transformer 304, and capacitors 316 and 318 are series connected across a winding 306b of transformer 306.

A PWM inverter 320 includes six diodes 324, each of which is connected in series with a different one of six IGBTs 322 (cathode to collector), forming a switching array. Further, the emitters of half of IGBTs 322 are connected in series with the anode of half of the diodes, forming three parallel pairs of series connected IGBTs/diodes 322/324. The common connection between the emitter of one IGBT 322 in each pair and the anode of the diodes 324 in the other pair connected that are in series is also coupled to the common connection between the series coupled capacitors comprising pairs 308 and 310, 312 and 314, and 316 and 318, respectively. An inductor 326 has one terminal connected to the anodes of three of the diodes 324 and another terminal coupled to the emitter of three of the IGBTs 322 at the ends of the three series connected pairs of IGBTs and diodes.

A stepped-wave inverter 332 also includes a switching array; this switching array comprises six GTOs 338 that are arranged in series connected pairs, so that each pair is connected in parallel with two other pairs of GTOs 338. In addition, six GTOs 340 comprise a second set of series connected pairs, each pair being in parallel with two other pairs of series connected GTOs 340. The common connection between GTOs 338 for each of the three series connected pairs are respectively connected to lines 330a, 330b, and 330c. The common connections between each pair of series connected GTOs 340 are coupled to a common connection between delta windings 336 comprising the stepped-wave inverter. An inductor 342 is connected between the anodes of three of GTOs 338 and the cathodes of three GTOs 340. Inductor 342 in stepped-wave inverter 332 develops a DC current $I_{DC_Q}$ that is applied to the switching network to produce currents $I_{QA}$, $I_{QB}$, and $I_{QC}$ on leads 330a, 330b, and 330c, respectively. The amplitude of these currents is controlled as a function of the gate signals applied to GTOs 338 and 340. As described above, the amplitude of these three currents, $I_{QA}$, $I_{QB}$, and $I_{QC}$, determines whether the reactive compensation signal is leading or lagging.

Similarly, a DC current $I_{DCH}$ is applied to IGBTs 322 to develop the voltage $V_H$ used to cancel harmonic distortion in the voltage applied to the load. The gate signals applied to these IGBTs thus control the level of voltage developed on capacitors 308, 312, and 316 to achieve the harmonic distortion compensation.

Figure 18:
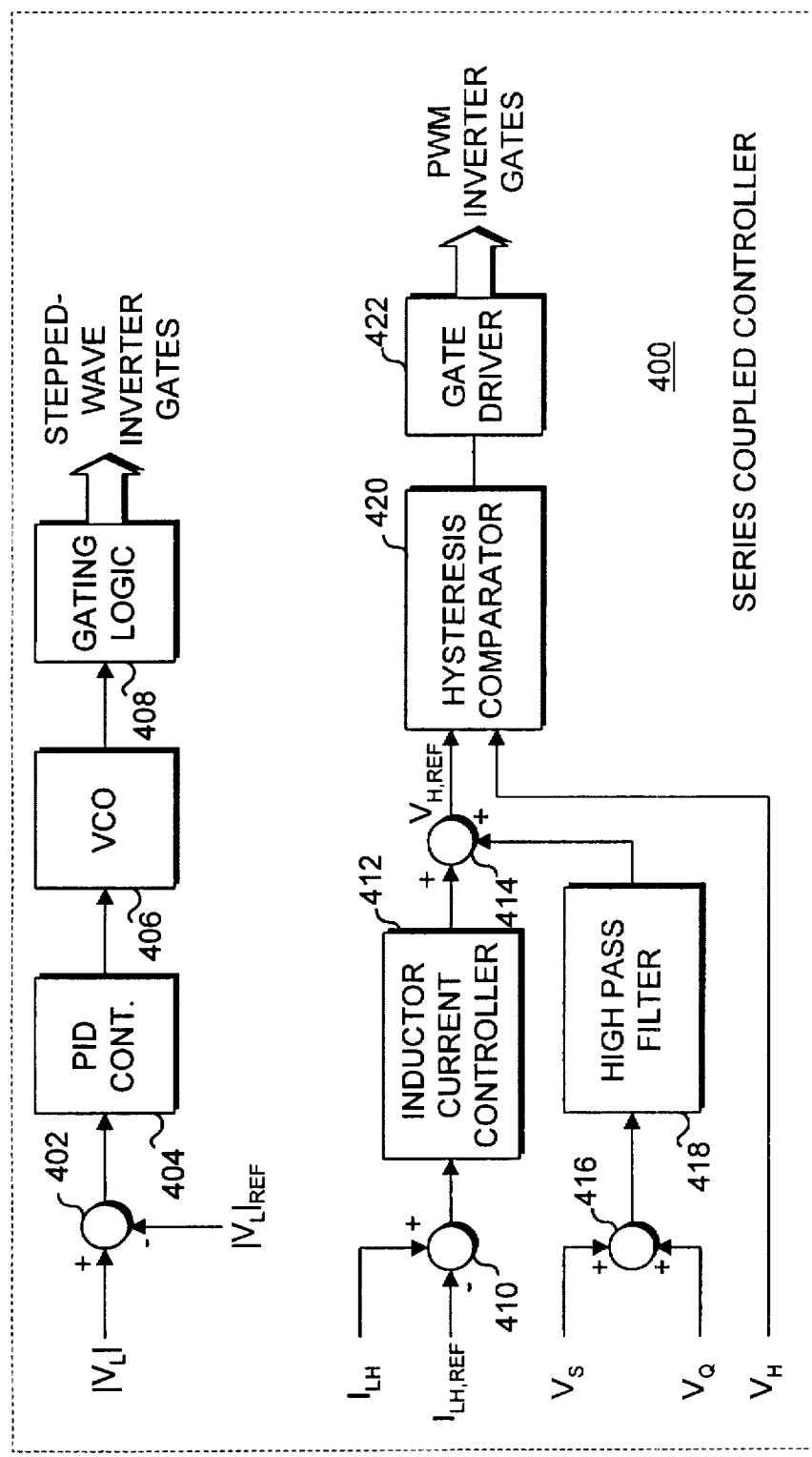
FIG. 18 is a schematic block diagram of a control for the series coupled harmonic distortion and reactive power compensator in accord with the present invention.

Referring now to FIG. 18, details of a control for the series coupled compensator are illustrated. The mathematical model for this control is similar to that required for the shunt type compensator described above. A subtraction block 402 determines the difference between the magnitude of the actual voltage $V_L$ applied to the load and the magnitude of a reference value for this voltage. The difference signal is applied to a PID controller 404, producing a signal applied to a VCO block 406. The feedback for this control acts like a phased lock loop to control the phase shift of the stepped-wave inverter by developing appropriate gate signals in a gating logic block 408. The gate signals insure a proper magnitude for voltage $V_Q$ on each of the phases.

The remaining portion of the controller includes a subtraction block 410 that determines the difference between the actual inductive current $I_{LH}$ and a reference for this value. The differential between the two values is applied to an inductor current controller block 412, producing a signal that is applied to an adder block 414. In addition, signals indicative of the supply voltage $V_S$ and the voltage developed across the capacitor coupled to the PWM inverter for the phase are added in an adder block 416, producing a signal that is applied to a high pass filter block 418. The output of the high pass filter block is added to the output of inductor current controller block 412 by adder 414, producing a reference voltage $V_{H.REF}$ that is applied to a hysteresis comparator block 420. The other signal applied to hysteresis comparator block 420 is the voltage developed by the PWM inverter for the phase being controlled. The hysteresis comparator produces a signal corresponding to the difference between the two input signals that is applied to a gate driver 422, to determine the gate signals used to actuate the PWM inverter gates for one of the phases. A similar approach is used for each of the other phases in the three-phase series coupled control.

The current through inductor 342 of stepped-wave inverter 332 (shown in FIG. 10) is approximately determined by the following expression:

$$I_{DC.Q} \cong \frac{\pi}{2\sqrt{6}} I_L \tag{16}$$

In addition, the inductance required is approximately determined by the following expression:

$$L_Q \cong \frac{0.39 V_Q}{F_1 I_L} \tag{17}$$

The DC link current, $I_{DC.H}$ in the PWM inverter should be at least twice the maximum value of $(I_L-I_Q)$ to insure proper control over the PWM inverter insertion voltage $V_H$ for each phase. The maximum value of the difference between the 12-step waveform and its fundamental component is $(I_{DC.Q}/2)$, yielding the following relationship:

$$I_{DC.H} \cong I_{DC.Q} \cong \frac{\pi}{2\sqrt{6}} I_L \tag{18}$$

The value of the inductance $L_H$ used in each PWM inverter is defined by:

$$L_H = \sum_n \frac{3\sqrt{2} \, V_n}{0.2 I_{DC.H} F_n} \tag{19}$$

where n indicates the order of the harmonic. Since the size of the capacitor used in each phase $C_H$ for insertion of $V_H$ is primarily determined by the switching frequency of the PWM inverter and the tolerance band of the inserted voltage, the capacitance is approximately determined by the following:

$$C_H \cong \frac{I_{DC.H} T_{sw}}{2 \Delta V_H} = \frac{I_{DC.H}}{2 \Delta V_H F_{sw}} \tag{20}$$

Unbalanced Load Compensator

Figure 17:
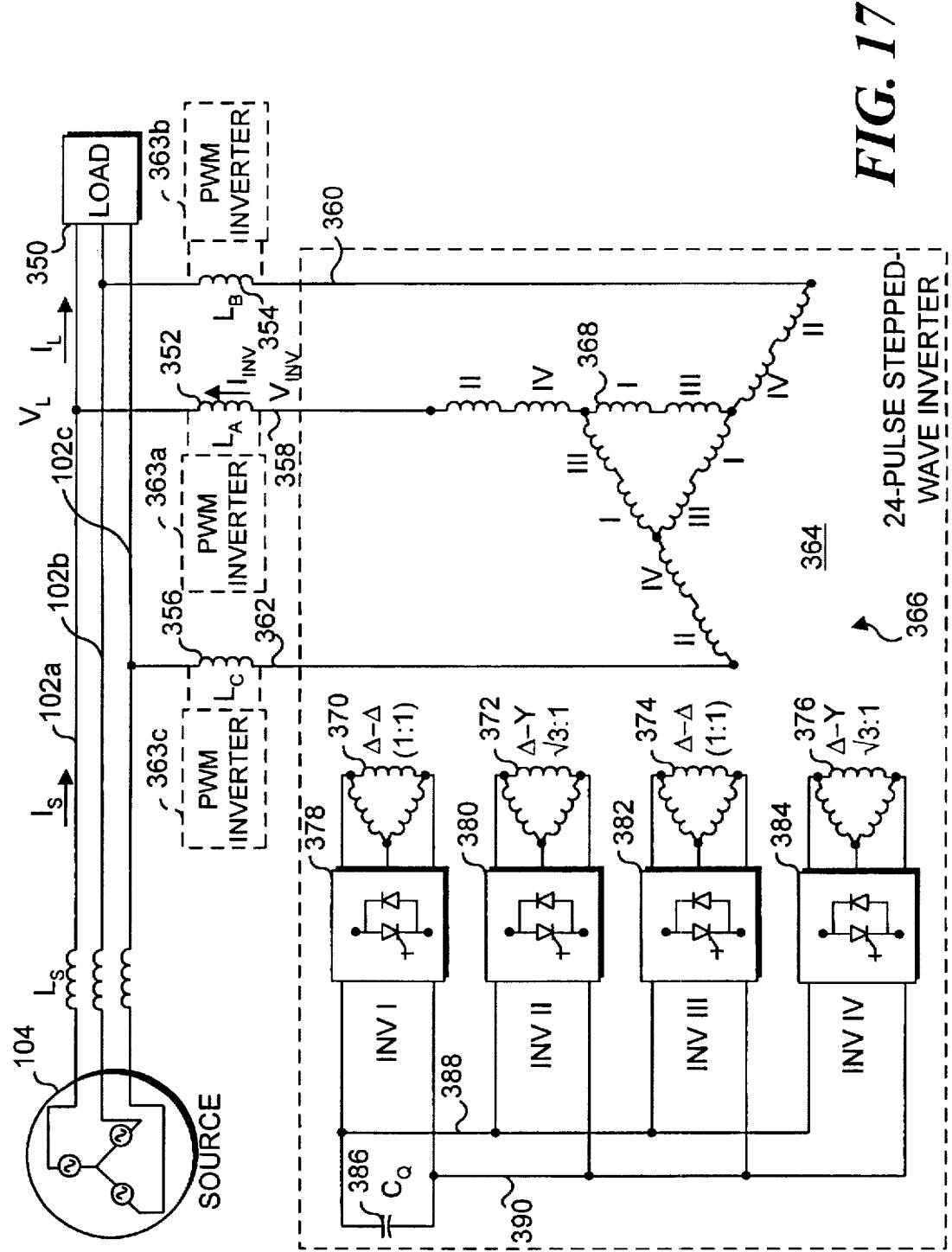
FIG. 17 is a schematic block diagram of a further embodiment of the present invention for compensating an unbalanced load.

While most three-phase electric systems operate with loads that are substantially balanced, occasionally, a substantial unbalanced current can be drawn by a significant difference in load on one of the phases, compared to the other phases. An unbalanced voltage can be caused by unequal voltage drops in the different phases, causing a flow of negative sequence currents in three-phase equipment connected to the power line. The effects of such a voltage unbalance can be severe for rotating machinery. For example, in induction motors, negative sequence currents can produce overheating in rotor windings and reduced output torque. Although traditional approaches have been used for unbalanced compensation, such as Scott-connected transformers and rotary converters, such devices are relatively bulky and do not respond rapidly to load variations. Although active components can be used, currently all present applications for active compensation using multi-pulse converters restrict control of the compensator to positive sequence components. Accordingly, a compensator 364 includes a 24-pulse stepped-wave inverter 366, as illustrated in FIG. 17, for use in compensating an unbalanced load 350 energized by source 104. Optionally, PWM inverters 363a, 363b, and 363c may also be included to compensate harmonic distortion on the power line, as described above. These PWM inverters, which are identical to PWM inverter 110a, are optionally coupled to each side of inductors 352, 354, and 356, which connect compensator 364 to the power line. Current flows from source 104 to load 350 through conductors 102a, 102b, and 102c. The current supplied by the source, $I_S$, is compensated for the unbalanced load; this current, $I_L$, is different between the phases.

Compensator 364 includes four three-phase inverters 378, 380, 382, and 384 that are supplied from a DC source comprising a capacitor 386, also identified in the drawing by $C_Q$. A line 388 couples the positive terminal of capacitor 386 to each of the inverters, and a line 390 couples the negative terminal of the capacitor to the inverters. Inverter 378 is coupled to the three nodes of a delta-winding 370. Similarly, inverters 380, 382, and 384 are coupled to the nodes of delta-windings 372, 374, and 376, respectively. Delta windings 370, 372, 374, and 376 are electromagnetically coupled to a transformer 368 having a combined delta/wye configuration. Specifically, delta windings 370 and 374 are coupled in a delta-delta relationship (1:1 winding ratio) with the windings of transformer 368. Delta windings 372 and 376 are coupled in a delta-wye relationship (a √3:1 winding ratio) with transformer 368. The windings of transformer 368 with which inverters 378, 380, 382, and 384 are respectively electromagnetically coupled are identified by Roman numerals I through IV, corresponding to the comparable identification provided on the left side of each of the inverters.

The positive and negative sequence instantaneous power components drawn by the load are determined using the following:

$$\begin{bmatrix} P_{L+} \\ Q_{L+} \end{bmatrix} = \begin{bmatrix} V_\alpha & V_\beta \\ -V_\beta & V_\alpha \end{bmatrix} \begin{bmatrix} I_{L\alpha} \\ I_{L\beta} \end{bmatrix} \tag{21}$$

$$\begin{bmatrix} S_{DL-} \\ S_{QL-} \end{bmatrix} = \begin{bmatrix} V_\alpha & -V_\beta \\ V_\beta & V_\alpha \end{bmatrix} \begin{bmatrix} I_{L\alpha} \\ I_{L\beta} \end{bmatrix} \tag{22}$$

Average power components, $\overline{P}_{L+}$ and $\overline{Q}_{L+}$, correspond to the fundamental positive sequence active and reactive power components, respectively. The average components, $\overline{S}_{DL-}$ and $\overline{S}_{QL-}$, result from the fundamental negative sequence load power. Compensator 364 is intended to cancel $\overline{Q}_{L+}$, $\overline{S}_{DL-}$, and $\overline{S}_{QL-}$, the fundamental positive sequence real power, $\overline{P}_{L+}$, being supplied by source 104. A small amount of real power, $P_{ERR}$, is exchanged to replenish losses in the compensator and to control the DC voltage supplied by capacitor 386 in response to reactive power output variations. The required compensating currents are determined from the following:

$$\begin{bmatrix} I^*_{inv\alpha} \\ I^*_{inv\beta} \end{bmatrix} = \begin{bmatrix} V_\alpha & -V_\beta \\ V_\beta & V_\alpha \end{bmatrix}^{-1} \begin{bmatrix} P_{err} \\ \overline{Q}_{L^+} \end{bmatrix} + \begin{bmatrix} V_\alpha & -V_\beta \\ V_\beta & V_\alpha \end{bmatrix} \begin{bmatrix} \overline{S}_{DL-} \\ \overline{S}_{QL-} \end{bmatrix} \quad (23)$$

The control scheme used to gate the switching network in the inverters of compensator 364 is based on flux control in the inverters. The output voltage of a six-pulse inverter can assume six states, which are represented by the six space vectors shown in FIG. 14. The three binary digits next to each vector in FIG. 14 represent the state of the switches for each of the three phases, where a binary one indicates that the switch is closed to connect to the positive terminal of the DC source (capacitor 386) and a binary zero indicates that the switch is closed to connect to the negative terminal of the DC source.

The output voltage provided by each of the inverters 378, 380, 382, and 384 can be integrated to determine the inverter "flux," the amplitude of which can be represented by a hexagon having sides parallel to the voltage vectors. The currents through each of inductors 352, 354, and 356, which couple compensator 364 to the A, B, and C phases, respectively, can each be determined by the following expression:

$$I_{inv} = \frac{1}{L}(\Psi_{inv} - \Psi_{bus}) \quad (24)$$

A desired or reference flux vector, $\Psi^*_{INV}$ can be determined from:

$$\Psi^*_{inv} = \Psi_{bus} = LI^*_{inv} \quad (25)$$

FIG. 15 illustrates an approximation of the inverter flux for a symmetrical gated compensator. The approximation of this value is represented by a regular hexagon. In contrast, FIG. 16 illustrates the inverter flux for an unsymmetrically gated compensator as required to compensate for an unbalanced load. For a balanced load, the desired or reference flux vector would be a circle and the best approximation is the regular hexagon shown in FIG. 15, which can be tracked by symmetrical gating of the switching network in the compensator. However, for an unbalanced linear load, the desired or reference flux vector is an ellipse, the eccentricity of which depends upon the degree of unbalance between the loads on each phase. The approximation of the elliptical track followed by the flux vector is a skewed hexagon like that shown in FIG. 16, which is obtained by using a switching pattern that provides the closest match to the instantaneous slope of the reference flux ellipse.

FIGS. 19A through 19C illustrate a scheme for controlling compensator 366 to compensate unbalanced load 350. In a block 450, the orthogonal components representing the voltage on each phase, $V_\alpha$ and $V_\beta$, are determined. These values are input to multiplier blocks 452, 454, 462, and 464. Similarly, the orthogonal values related to the current in each of the phases, $I_\alpha$ and $I_\beta$ are determined by a block 460 for input to the four multiplier blocks. The product of multiplier blocks 452 and 454 are added by an adder block 456, producing a value for the instantaneous real power of the load. This value is input to a low pass filter block 458 that averages the power producing an output, $\overline{P}$. The products of multiplier blocks 462 and 464 are input to a subtraction block 466, which determines the difference between these two values. This difference is equal to the instantaneous imaginary power of the load, Q, and is input to a low pass filter block 468. The low pass filter block averages the imaginary power, producing an output, $\overline{Q}$.

Referring now to FIG. 19B, it will be apparent that blocks 450 through 464 are identical to the correspondingly numbered blocks in FIG. 19A in terms of their function. However, the products from multiplier blocks 452 and 454 are input to a subtraction block 470 in FIG. 19B to determine the value $S_D$. A low pass filter 472 determines an average value for the parameter. Similarly, the product of multiplier blocks 462 and 464 are added by an adder block 474, producing a value for $S_Q$, which is input to low pass filter block 476 to determine an average value for this parameter.

In FIG. 19C, an inverse power transform block 480 receives several different inputs, including $V_\alpha$ and $V_\beta$, which are also applied to integration blocks 498 and 504, respectively. A subtraction block 482 determines the difference between $\overline{S}_{LD-}$ and $\overline{S}_{INVD-}$ producing a result that is input to a PID block 484. The output of this block is summed in an adder block 486 with $\overline{S}_{LD}$, producing a desired value $S^*_{INVD-}$ that is input to inverse power transform block 480. In a similar manner, using a subtraction block 488 and a PID block 490, an adder block 492 determines the desired value of $S^*_{INVQ-}$ as a function of $\overline{S}_{LQ-}$ and of $\overline{S}_{INVQ-}$. Values for $\overline{Q}_{INV}$ and $\overline{Q}_L$ are input to a subtraction block 494, and the difference is input to a PID block 496. The output of the PID block is a signal $P^*_{INV}$, which is also input to inverse power transform block 480. The remaining input to the inverse power transform block is a value $Q^*_{INV}$, which is equal to $\overline{Q}_L$.

The output of integration block 498 is applied to an adder or adder block 500. Inverse power transform block 480 produces an output $I^*_{INV\alpha}$ and an output $I^*_{INV\beta}$ that are respectively input to blocks 508 and 510, in which the input signals are multiplied by L, the inductance. The output of block 508 is also input to adder block 500, producing a sum corresponding to $\Psi^*_{INV\alpha}$. The outputs of integration block 504 and of block 510 are input to an adder block 506, which determines the value $\Psi^*_{INV\beta}$. The reference flux values provided by adder blocks 500 and 506 are input to a block 502, which determines the arc tangent of the ratio of the two values, returning an angle for the reference flux vector. A block 512 determines the integer portion of the input angle divided by the fraction π/M, where M is the number of pulses used in the inverter, i.e., 24 in compensator 366. The integer portion of the quotient is input to a ring counter 514, causing it to generate the gate signals applied to the inverters comprising compensator 366.

Referring to FIG. 17, the capacitance of capacitor 386, $C_Q$ is selected so that the peak-to-peak voltage ripple is limited to 0.1 p.u. The value of the capacitor is approximately defined by:

$$C_Q \cong \frac{2.4VI^2}{FV_{DC}^2} \quad (26)$$

Although the present invention has been described in connection with several preferred embodiments for practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. Apparatus for actively compensating a reactive power load and a harmonic distortion on an alternating current power line, comprising:
   (a) a stepped-wave inverter that produces a reactive compensation signal for use in dynamically compensating the reactive power load;
   (b) a pulse width modulation inverter that produces a harmonic compensation signal on its output terminals for use in compensating the harmonic distortion on the power line; and (c) means for coupling the reactive compensation signal and the harmonic compensation signal to the power line, so that the reactive power load and the harmonic distortion on the power line are compensated by said signals, and so that a voltage level across the output terminals of said pulse width modulation inverter is substantially less than a voltage on the alternating current power line.

2. The apparatus of claim 1, further comprising:

(a) harmonic distortion monitoring means for determining a harmonic distortion on the power line due to the load;

(b) voltage control means for adjusting a voltage applied in the pulse width modulated inverter; and (c) means coupled to the harmonic distortion monitoring means for controlling the voltage control means to adjust the harmonic compensation signal in response to the harmonic distortion on the power line.

3. The apparatus of claim 1, wherein the means for coupling comprise an inductor having two terminals, including one terminal that is connected to the power line and another terminal that is connected to the stepped-wave inverter, said terminals of the pulse width modulator being coupled to said two terminals of the inductor.

4. The apparatus of claim 1, wherein the pulse width modulator includes a high pass filter for suppressing a switching distortion component of the harmonic compensation signal.

5. The apparatus of claim 1, wherein the stepped-wave inverter includes a switching network and a capacitor for storing charge as a source of a direct current voltage supplied to the switching network.

6. The apparatus of claim 1, further comprising a controller for the stepped-wave inverter and the pulse width modulated inverter, said controller comprising:

(a) means for determining a reactive power of the load;

(b) means for monitoring the reactive compensation signal; and (c) means for controlling the stepped-wave inverter, in response to both the reactive power of the load and the reactive compensation signal, to determine a phase shift of the stepped-wave inverter.

7. The apparatus of claim 1, wherein the means for coupling comprise a transformer having one winding connected in series with the power line and another winding coupled to the pulse width modulated inverter and the stepped-wave inverter.

8. The apparatus of claim 7, wherein the pulse width modulated inverter is capacitively coupled to the other winding of the transformer.

9. The apparatus of claim 1, wherein the power line comprises three phases, further comprising a separate pulse wave modulator inverter for each of the three phases.

10. The apparatus of claim 9, wherein the stepped-wave inverter includes a switching network.

11. The apparatus of claim 10, wherein the stepped-wave inverter further includes a wye-delta winding transformer, wye windings thereof each being coupled to a different one of the three phases and to the switching network, and delta windings of the wye-delta winding transformer being coupled to the switching network.

12. The apparatus of claim 11, wherein the switching network comprises a plurality of electronic switches connected in parallel with a corresponding plurality of diodes, said switching network being coupled to a capacitor that is charged by current from the three phases.

13. The apparatus of claim 10, wherein the switching network is gated asymmetrically to compensate a phase unbalanced reactive load.

14. A compensator for reactive power and harmonic distortion on an alternating current three-phase power line that supplies power to a load, comprising:

(a) pulse width modulated inverter means coupled to each phase of the three-phase power line, for producing three harmonic distortion compensation signals, each of which compensate for a harmonic distortion caused by the load on a different phase of the three-phase power line;

(b) a stepped-wave inverter that produces a reactive compensation signal to compensate each of the three phases for a reactance of the load coupled to the three-phase power line; and (c) means for coupling the pulse width modulation inverter means and the stepped-wave inverter to the three-phase power line, while decoupling the pulse width modulator means from the stepped-wave inverter, so that a switching frequency of the pulse width modulation inverter means is substantially greater than a fundamental frequency of an alternating current flowing in the three-phase power line, while a switching frequency of the stepped-wave inverter is substantially equal to the fundamental frequency of the alternating current flowing in the three-phase power line.

15. The compensator of claim 14, wherein the pulse width modulation inverter means comprise three pulse width modulation inverters, each of the pulse width modulation inverters being coupled to a different phase of the three-phase power line to supply the harmonic distortion compensation signal thereto.

16. The compensator of claim 15, wherein the means for coupling comprise three inductors, each of the three inductors having a terminal that is connected to a different phase of the three-phase power line, and another terminal connected to the stepped-wave inverter, each pulse width modulation inverter being connected to the terminals of a different one of the three inductors for supplying the harmonic distortion compensation signals to the three-phase power line, a voltage developed across each of the three inductors and the pulse width modulation inverter being substantially less than a voltage on the three-phase power line.

17. The compensator of claim 14, further comprising means for dynamically controlling the pulse width modulation inverter means and the stepped wave inverters, so that the harmonic distortion compensation signal and the reactive compensation signal applied to each phase are adjusted to compensate for changes in the harmonic distortion on the three-phase power line and changes in the reactance of the load occurring over time.

18. The compensator of claim 17, wherein the means for dynamically controlling comprise:

(a) current monitoring means, for monitoring a load current in the three-phase line, producing a load current indicative signal;

(b) potential monitoring means, for monitoring a voltage on the three-phase line, producing a voltage indicative signal;

(c) reactive current monitoring means, for monitoring the current of the reactive compensation signal, producing a reactive compensation current indicative signal;

(d) harmonic distortion compensation current monitoring means, for monitoring the current of the harmonic distortion compensation signal, producing a harmonic distortion compensation current indicative signal; and (e) reactive load determining means, coupled to receive the load current indicative signal, the voltage indicative signal, and the reactive compensation current indicative signal, producing a signal indicative of a phase shift required to control the stepped-wave inverter so that the reactive compensation signal compensates for the reactance of the load.

19. The compensator of claim 18, wherein the means for dynamically controlling further comprise:

(a) pulse width modulation inverter supply voltage monitoring means, for producing a pulse width modulation inverter supply voltage indicative signal for each of the phases; and (b) harmonic distortion compensation current determining means, coupled to receive the voltage indicative signal, the signal indicative of the reactive compensation signal, and the pulse width modulation inverter supply voltage indicative signal, for determining a desired harmonic distortion compensation signal current to control the pulse width modulation inverter means so that the harmonic distortion compensation signal for each phase is substantially equal to the desired harmonic distortion compensation signal for said phase.

20. The compensator of claim 14, wherein the pulse width modulation inverter means include a switch array coupled to a capacitor that stores a charge sufficient to supply the harmonic distortion compensation signal to each phase.

21. The compensator of claim 20, further comprising means for adjusting a voltage applied to the capacitor to compensate for losses in the switch array and as a result of any leakage current through the capacitor.

22. The compensator of claim 21, wherein the stepped-wave inverter further comprises a wye-delta winding transformer having terminals that are coupled to the three-phase power line and to the switch array, and wherein the reactive compensation signal comprises a plurality of potential steps of successively varying magnitude during a cycle of a fundamental frequency of the three-phase power line, said wye-delta transformer providing a plurality of phase angles for input to the stepped-wave inverter to produce said plurality of potential steps.

23. The compensator of claim 14, wherein the stepped-wave inverter comprises a switch array coupled to a capacitor that stores a charge used for producing the reactive compensation signal.

24. The compensator of claim 23, wherein the switch array includes a plurality of switches that are controlled by gating signals to convey a current from the capacitor, said gating signals being symmetrical to compensate for a balanced reactive load and asymmetrical to compensate for an unbalanced load.

25. The compensator of claim 14, wherein the means for coupling comprise three transformers, each transformer having one winding coupled in series with a different phase of the three-phase power line and another winding coupled to a pair of series connected capacitors, said pulse width modulation inverter means being coupled to a common connection between the pair of capacitors for each phase, and said stepped-wave inverter being coupled to the other winding of the transformer on each phase of the three-phase power line, said reactive compensation signal and said harmonic distortion compensation signal being coupled into the three-phase power line by the three transformers so that the load receives conditioned power.

26. Apparatus for compensating an unbalanced reactive load on a three phase power line, comprising:

(a) a stepped-wave inverter coupled to each phase of the three phase power line, said stepped-wave inverter including a switching network that is controlled to produce a reactive power compensation signal for each phase as required to compensate the unbalanced reactive load;

(b) means for monitoring current and potential on the three phase power line and producing signals indicative of the reactive power compensation signal required for compensating each phase for the unbalanced reactive load; and (c) control means, coupled to receive the signals, for providing gating signals to the switching network at unequal time intervals to produce the reactive power compensation signals required for compensating the reactive power for each phase of the unbalanced load.

27. The apparatus of claim 26, wherein the gating signals applied to the switching network cause a flux vector indicative of the reactive compensation signal to approximate an eccentric ellipse, an eccentricity of said ellipse corresponding to an extent of unbalance of the unbalanced load.

28. The apparatus of claim 26, further comprising a pulse width modulation inverter coupled to each phase of the power line to compensate for harmonic distortion on the power line.

29. The apparatus of claim 28, further comprising three inductors, a different inductor being used for coupling the stepped-wave inverter to each phase of the power line, wherein each pulse width modulation inverter is connected to the inductor coupled to one of the phases of the power line.

* * * * *